US007680847B2

United States Patent
Ebata et al.

(10) Patent No.: US 7,680,847 B2
(45) Date of Patent: *Mar. 16, 2010

(54) METHOD FOR REBALANCING FREE DISK SPACE AMONG NETWORK STORAGES VIRTUALIZED INTO A SINGLE FILE SYSTEM VIEW

(75) Inventors: Atsushi Ebata, Yokohama (JP); Shinichi Kawamoto, Hachioji (JP); Jun Okitsu, Kokubunji (JP); Yoshiko Yasuda, Tokorozawa (JP)

(73) Assignee: Hitachi, Ltd., Tokyo (JP)

( * ) Notice: Subject to any disclaimer, the term of this patent is extended or adjusted under 35 U.S.C. 154(b) by 166 days.

This patent is subject to a terminal disclaimer.

(21) Appl. No.: 11/588,213

(22) Filed: Oct. 27, 2006

(65) Prior Publication Data
US 2007/0043793 A1 Feb. 22, 2007

Related U.S. Application Data

(63) Continuation of application No. 10/646,894, filed on Aug. 25, 2003, now Pat. No. 7,146,389.

(30) Foreign Application Priority Data

Aug. 30, 2002 (JP) ............... 2002-252345

(51) Int. Cl.
*G06F 17/30* (2006.01)
(52) U.S. Cl. ............... 707/205; 707/10; 707/202; 709/226; 709/238; 711/162; 711/165; 711/171; 718/104; 718/105
(58) Field of Classification Search ............... 707/10, 707/205, 202; 711/162, 165, 171; 709/226, 709/238; 718/104, 105
See application file for complete search history.

(56) References Cited

U.S. PATENT DOCUMENTS

| 6,029,168 A | 2/2000 | Frey |
| 6,035,373 A | 3/2000 | Iwata ............... 711/114 |

(Continued)

FOREIGN PATENT DOCUMENTS

| JP | 5241934 | 9/1993 |

(Continued)

OTHER PUBLICATIONS

"OTG DiskXtender 2000 with Maxtor MaxAttach™", Network Attached Storage Solutions, Technical Spotlight, Feb. 2002, 3pgs.

(Continued)

*Primary Examiner*—John E Breene
*Assistant Examiner*—Phong Nguyen
(74) *Attorney, Agent, or Firm*—Brundidge & Stanger, P.C.

(57) ABSTRACT

A method for moving files between network storages in a virtualized network storage system having multiple network storages and rebalancing the free disk spaces. It periodically judges whether to start rebalancing. Two different conditions are adopted for the determination of start: (a) an imbalance of free disk spaces and the minimum value of the free disk spaces is less than a threshold and (b) an imbalance of free disk spaces and the frequency of accesses to the system is less than a threshold. Rebalancing is performed until the difference in free disk spaces falls below the threshold without exceeding the maximum execution time of rebalancing. If a request to write into a file which is being moved from a client takes place during a file moving step, the movement of the file is aborted and the file is deleted from the destination.

6 Claims, 19 Drawing Sheets

U.S. PATENT DOCUMENTS

| | | | |
|---|---|---|---|
| 6,105,053 A * | 8/2000 | Kimmel et al. | 718/105 |
| 6,640,278 B1 | 10/2003 | Nolan et al. | 709/223 |
| 6,658,449 B1 * | 12/2003 | Brenner et al. | 718/105 |
| 6,728,770 B1 * | 4/2004 | Bradford et al. | 709/226 |
| 6,745,207 B2 | 6/2004 | Reuter et al. | 707/100 |
| 6,745,286 B2 * | 6/2004 | Staub et al. | 711/114 |
| 6,816,891 B1 * | 11/2004 | Vahalia et al. | 709/214 |
| 6,898,670 B2 | 5/2005 | Nahum | |
| 6,912,537 B2 | 6/2005 | Selkirk et al. | |
| 6,971,044 B2 | 11/2005 | Geng et al. | 709/226 |
| 6,990,667 B2 * | 1/2006 | Ulrich et al. | 718/105 |
| 7,010,622 B1 | 3/2006 | Bauer et al. | 709/252 |
| 7,054,948 B2 * | 5/2006 | Rhodes | 709/238 |
| 7,146,389 B2 * | 12/2006 | Ebata et al. | 707/205 |
| 2002/0004883 A1 | 1/2002 | Nguyen et al. | |
| 2002/0032835 A1 * | 3/2002 | Li et al. | 711/114 |
| 2002/0103889 A1 | 8/2002 | Markson et al. | |
| 2002/0133491 A1 | 9/2002 | Sim et al. | |
| 2002/0161983 A1 | 10/2002 | Milos et al. | 711/202 |
| 2002/0174295 A1 * | 11/2002 | Ulrich et al. | 711/114 |
| 2002/0194526 A1 * | 12/2002 | Ulrich et al. | 714/6 |
| 2003/0079083 A1 | 4/2003 | Lubbers et al. | 711/114 |
| 2003/0084241 A1 | 5/2003 | Lubbers et al. | |
| 2003/0101383 A1 * | 5/2003 | Carlson | 714/42 |
| 2003/0115218 A1 | 6/2003 | Bobbitt et al. | |
| 2003/0144894 A1 | 7/2003 | Robertson et al. | 705/8 |
| 2003/0182501 A1 | 9/2003 | George et al. | |
| 2003/0220985 A1 | 11/2003 | Kawamoto et al. | |
| 2004/0010654 A1 | 1/2004 | Yasuda et al. | |
| 2004/0030822 A1 | 2/2004 | Rajan et al. | |
| 2004/0068609 A1 | 4/2004 | Umberger et al. | |
| 2004/0205143 A1 | 10/2004 | Uemura | |
| 2004/0215622 A1 | 10/2004 | Dubnick et al. | |

FOREIGN PATENT DOCUMENTS

| | | |
|---|---|---|
| JP | 200151890 | 2/2001 |
| JP | 200299519 | 4/2002 |

OTHER PUBLICATIONS

C. Karamanolis, et al "DiFFS: A Scalable Distributed File System", HP Laboratories, Jan. 24, 2001, Hewlett-Packard Company, 7 pgs.

* cited by examiner

FIG. 4

NETWORK STORAGE INFORMATION TABLE 155

| | | | | | | |
|---|---|---|---|---|---|---|
| 1551 | 1 | 2 | 3 | 4 | 5 | ... |
| 1552 | 120 | 100 | 200 | 180 | – | ... |
| 1553 | 30 | 20 | 80 | 90 | – | ... |

FIG. 6

NETWORK STORAGE ATTRIBUTION TABLE 165

| | 1 | 2 | 3 | 4 | 5 | ... |
|---|---|---|---|---|---|---|
| 1651 | 1 | 2 | 3 | 4 | 5 | ... |
| 1652 | NULL | NULL | Don't Select | Don't Select | — | ... |
| 1653 | NULL | Don't Select | NULL | Don't Select | — | ... |

STEP 1703: SELECTION OF A FILE TO BE NAMED

STEP 1705: FILE MIGRATION

STEP 2703: SELECTION OF A TARGET FILE GROUP FOR MIGRATION

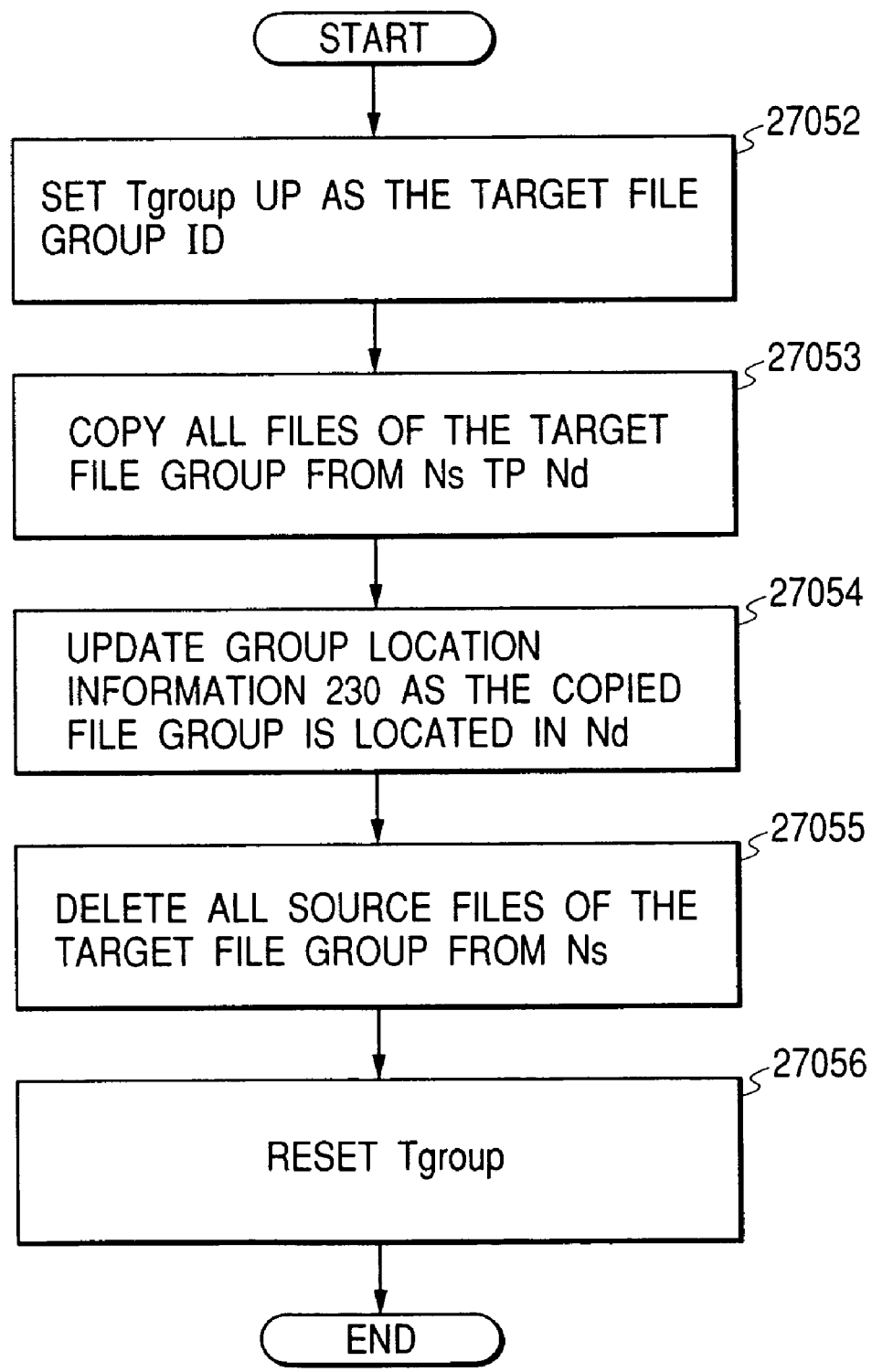

METHOD FOR REBALANCING FREE DISK SPACE AMONG NETWORK STORAGES VIRTUALIZED INTO A SINGLE FILE SYSTEM VIEW

CROSS-REFERENCE TO RELATED APPLICATIONS

The present application is a continuation of application Ser. No. 10/646,894, filed Aug. 25, 2003 now U.S. Pat. No. 7,146,389; and is related to application Ser. No. 10/335,853, filed Jan. 3, 2003, entitled "System and Method for Virtualizing Network Storage into a Single File System View" and application Ser. No. 10/387,382, filed Mar. 14, 2003, entitled "System and Method for Virtualizing Network Storage into a Single File System View," the disclosures of which are hereby incorporated by reference.

FIELD OF THE INVENTION

The present invention relates to a network storage system virtualized into a single file view and more particularly to a method for rebalancing the occupied disk spaces in a network storage system involving the migration of files between network storage devices.

BACKGROUND OF THE INVENTION

Along with the advance made in network technology in recent years, a new practice has become widespread. The practice is that storages are separated from computers and attached to networks, and access thereto is made through the networks. Such a storage attached to a network is referred to as network storage.

Typical examples of network storage are the SAN storage and NAS (Network Attached Storage). The SAN storage uses SAN (Storage Area Network). The SAN storage has high reliability and performance. However, the cost of SAN storage is extremely high and is mainly used by enterprising businesses. The NAS on the other hand uses the IP network which is most widespread. The performance of NAS is lower than SAN storage but the cost is lower than SAN and it is also easier to use.

In recent years, instead of expensive large-scale storages, an inexpensive, small-scale network storage has been introduce and thereafter added another one as required. However, this method involves a problem. If a new network storage is added to an existing system, data must be moved from the existing network storage to the new network storage. Also, clients (including computers) and the network storages must be reconnected with each other. As the result, the management cost of the system increases.

One of methods for reducing the management cost is visualization of network storages. This is a technique for virtualizing multiple network storages as a single storage unit for clients.

A number of methods have been developed for virtualizing multiple network storages. A method is disclosed at the website <www.maxtor.com/products/maxattach/products/applicationSpotlights/OTG_solutionsSpotlight.htm> (Document 1), for example. The method is that a control server called primary storage that also functions as a network storage unit manages the file location information in a centralized manner. In the method, a network storage in which a file is to be stored is determined by time when the file is accessed last. Newly created files are stored in primary storage, and files not accessed for a certain period of time are then moved to secondary storage. The primary storage receives a file access request from a client. If the file currently does not exist in the primary storage, the file of the secondary storage is accessed. Thus, the network storages look to the client as if they were a single unit.

Another method for virtualization is described in DiFFS: a Scalable Distributed File System, Christos Karamanolis et. al., HP Laboratories Palo Alto, HPL-2001-19, Jan. 24, 2001 (Document 2). The method is that files and directories are managed by logical volume basis. The logical volume identifiers are recorded in directory entries for managing directories and files. The directory entries are distributed and placed in individual logical volumes. Each network storage has a table that correlates between logical volume identifiers and the network storage identifiers for the storage locations thereof. The network storage specifies the network storage identifier which stores a file by the table and a directory entry concerned. When a new network storage is added to the system, the logical volume concerned is moved from the existing network storage to the new network storage. At this time, the mirroring function of LVM (Logical Volume Manager) which is a virtualizing technique is used.

A further method for virtualization is disclosed in U.S. Pat. No. 6,029,168 (Document 3). The method is that one file is partly distributed and placed in multiple network storages. The method involves file management information on the range and order of distribution in network storages in which files are located. If a new network storage is added, the file management information is updated. New files created after the update are placed in a new range of distribution. In this method, however, the file management information on existing files is not updated, and any existing file or any part thereof is not moved to the new network storage.

Japanese Patent Laid-Open No. H6(1994)-59982 (Document 4) discloses a control method for virtual storage in a computer. The method is that it is judged based on the free disk space in a high-speed external storage unit whether data should be moved to a low-speed external storage unit. The method involves a high-speed external storage unit faster than magnetic disks and a low-speed external magnetic disk storage unit which is slower but has a large capacity. If the free disk space in the high-speed external storage unit is reduced to a threshold or below, data is moved to the low-speed external storage unit. When the free disk space in the high-speed external storage unit exceeds the threshold, the data is returned from the low-speed external storage unit to the high-speed external storage unit. Thus, the two external storage unit look to the computer as if they were a single virtual storage.

In the method described in Document 1, a storage which stores a file is determined by time when the file is accessed last. Therefore, the occupied disk space of the primary storage and that of the secondary storage becomes steadily imbalance storage. In the method disclosed in U.S. Pat. No. 6,029,168, files are uniformly distributed to multiple network storages. Consequently, the occupied disk space is balanced between network storages which are added to the system around the same time. However, there is a steady imbalance in the occupied disk space between network storages which are added to the system at different times. This is because files are not moved between them. If a network storage is filled with capacity due to such a steady imbalance, files cannot be written even if there are some free disk spaces in the other network storages.

This problem can be solved by adding a function of leveling the disk usage rates of the individual network storages to the method described in non-patent Document 2. However, the free disk spaces in the individual network storages are uneven in a system wherein the disk spaces in the individual network storages are uneven even if the disk usage rates are equal. If a large file is written to a network storage lowest in free disk space here, the storage is filled with capacity, and files cannot be written.

In the method described in Document 2, access requests from clients are buffered while a logical volume is being moved. Therefore, if access requests from clients frequently occur during the logical volume migration, the buffer can become full. In case of the buffer full, the system cannot process access requests anymore, and then access seems to be stopped from clients.

The method disclosed in Document 3 provides a hint to solving the problem which is caused by writing large files in that attention is paid to the free disk space in the external storage unit. However, the method is predicated on a system comprising only two storages, high-speed external storage and low-speed external storage. The method as it is cannot be applied to a storage system composed of multiple network storages.

A first object of the present invention is to provide a method for rebalancing the free disk spaces in a network storage system virtualized into a single file system view with the disk spaces in the network storages thereof uneven, wherein a steady imbalance of the free disk spaces among the network storages is prevented so that clients can always use the system and even if client writes large files, a maximum quantity of data can be written to disks managed by the virtualized network storage system.

A second object of the present invention is to provide a method for rebalancing the free disk spaces in a network storage virtualized into a single file system view involving file migration between network storages thereof, wherein access requests from clients are not stopped while a file is being moved between network storages.

SUMMARY OF THE INVENTION

The first object of the present invention can be attained by a means for rebalancing the free disk spaces among individual network storages. More specifically, the means comprises a free disk space examining step in which the free disk spaces in the individual network storage devices are examined; a start of rebalancing judging step in which the maximum value and minimum value of the free disk spaces are determined from the result of the free disk space examining step and start of the processing is determined when the difference between the maximum value and minimum value exceeds a predetermined difference threshold; a network storage device selecting step in which the network storage device having the smallest free disk space is selected as the source network storage device and the network storage device having the largest free disk space is selected as the destination network storage device; a file selecting step in which one or more files stored in the source network storage device are selected as files to be moved; a file moving step in which the files are moved from the source network storage device to the destination network storage device and the file location information for the files to be moved is updated and; an end of rebalancing judging step in which if the difference between the maximum value and minimum value of the free disk spaces is equal to or greater than the difference threshold, it is judged that the operation should be returned to the free disk space examining step or network storage device selecting step and processing should be continued, and if the difference between the maximum value and minimum value of the free disk spaces is less than the difference threshold, end of the processing is determined.

The second object of the present invention can be attained by a means for, if a client sends a file write request while the file is being moved in the file moving step, stopping the movement. More specifically, the means does it as follows: after a file is selected in a source network storage device, the means copies the file in the source network storage to a destination network storage device. After copying, the means compares the time when the file to be moved is updated last with the time when the copy file of the file to be moved is created. If the time of copy file creation is later than the time of last update, the file to be moved is deleted from the source network storage device. Then, the file moving step is terminated. If the time of last update is later than the time of copy file creation, the copy of the file to be moved is deleted from the destination storage device. Then, a file to be moved is selected again.

The second object of the present invention can be also attained by abandoning write requests from clients. A request to write to a file to be moved is abandoned and the result of requesting is not sent back to the client. Thus, the client is made to judge that some network trouble has occurred. Then, while the client resends a write request, the movement of the file is completed.

BRIEF DESCRIPTION OF THE DRAWINGS

FIG. 4 is a drawing illustrating a network storage information table used in linkage between the free disk space measuring unit and the rebalancing controller.

FIG. 6 is a drawing illustrating a network storage attribute table used in linkage between the rebalancing controller and the file object mover.

FIG. 19 is a drawing illustrating in details the flow of movement of target file groups for migration caused by the file object mover in the second embodiment of the present invention.

DETAILED DESCRIPTION OF THE PREFERRED EMBODIMENTS

Figure 1:
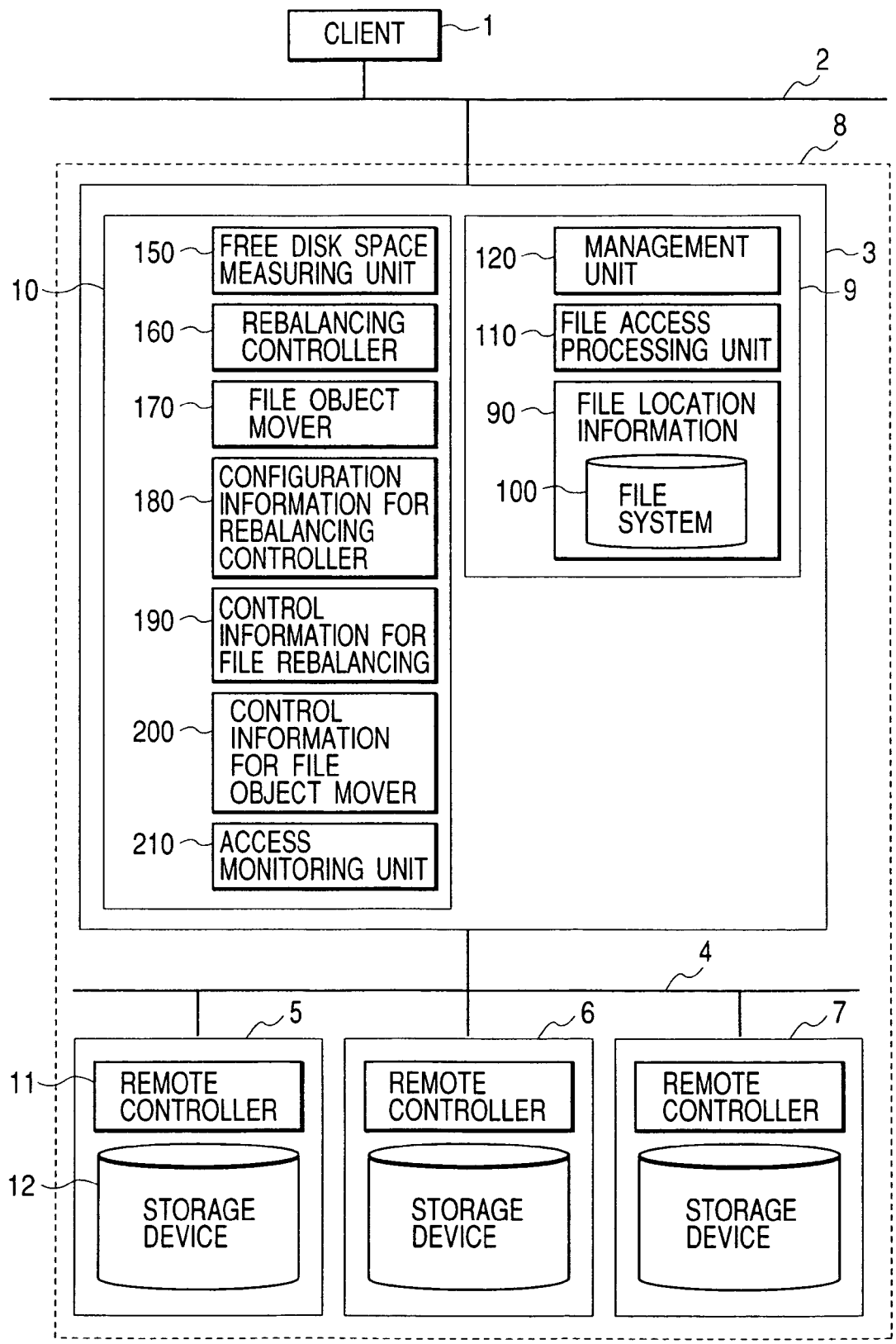
FIG. 1 is a drawing illustrating the overall constitution of the virtualized network storage system including a first embodiment of the present invention.

FIG. 1 is a drawing illustrating the overall constitution of the information system including the first embodiment of the present invention. A client 1 is connected with a virtualizing device 3 comprising a virtualizing means 9 and a free disk space rebalancing means 10 of the present invention through a network 2. The virtualizing device 3 is connected with network storages 5, 6, and 7 through a network 4. The network storages 5, 6, and 7 may be attached to the network 2 instead of providing the network 4. Where the networks 2 and 4 are separated, movement of files associated with free disk space rebalancing and processing of file access requests from clients can be physically separated from each other. Therefore, these processing steps can be carried out at high speed. Meanwhile, where the network storages 5, 6, and 7 are attached to the network 2, movement of files associated with free disk space rebalancing and processing of file accesses from clients are implemented in the same network. In this case, the performance of the network is impaired, but the network 4 is obviated, which leads to cost reduction. The virtualizing device 3 provides the virtualized network storage system 8 wherein the network storages 5, 6, and 7 are virtualized into a single file system view for clients by the virtualizing means 9. Owing to the free disk space rebalancing means 10 of the present invention, the disk spaces in the virtualized network storage system 8 can be effectively utilized.

(Network Storage)

The network storages 5, 6, and 7 are constituted with publicly known arts, and comprise a remote controller 11 and a storage device 12. The storage device 12 is managed by a file system. The network storages 5, 6, and 7 may be dedicated devices or general-purpose servers or workstations equipped with a storage device. Or, they may be personal computers provided with a remote controller.

The remote controller 11 accepts mount requests or create requests, read requests, write requests or requests to make directories from clients connected to the network. Then, the remote controller 11 creates, reads from, or writes to files, makes directories, or performs other processing with the storage devices 12. The remote controller 11 uses a file access protocol to communicate with clients. Available file access protocols include NFS (Network File System) developed by Sun Microsystems, Inc. and CIFS (Common Internet File System) developed by Microsoft Corporation. In the first embodiment, it is assumed that NFS is used. In response to requests from NFS, the remote controller 11 performs file access processing. At this time, the remote controller 11 uses publicly known mountd and nfsd.

(Virtualizing Device)

The virtualizing device 3 comprises the virtualizing means 9 based on publicly known arts and the free disk space rebalancing means 10 of the present invention. The virtualizing device 3 does not hold the data portions of files and is a dedicated device tailored to management of the virtualized network storage system 8.

The visualizing means 9 comprises file location information 90, a file access processing unit 110, and a management unit 120. The file location information 90 holds correlation between files managed in the virtualized network storage system 8 and the identifies of network storages which keep the files. The details will be described in the section of (File Location Information) below. The file access processing unit 110 accepts a file access request in the virtualized network storage system 8 from the client 1, and processes the file access request. The details will be described in the section of (File Access Processing Unit) below. The management unit 120 accepts instructions from an administrator who manages the virtualized network storage system 8 through Web or a console. These instructions includes an instruction to change the setting of the virtualizing device 3 and an instruction to change the configuration of the virtualized network storage system 8. In response to these instructions, the management unit 120 changes the contents of the file location information 90. The configuration information for the free disk space rebalancing means 10 of the present invention is also set by the administrator through the management unit 120. The details will be described in the section of (Configuration Information for Rebalancing Controller) below.

The network storages 5, 6, and 7 in which files are to be stored may be provided with the same directory structure as the virtualized network storage system 8. Alternatively, the network storages 5, 6, and 7 may be provided with their own directory structure. In case of the former, an advantage is that, even if the directory structure of the virtualized network storage system 8 is destroyed due to some trouble or the like, it can be restored using the directory structure of the individual network storages 5, 6, and 7. However, the directory structure must be kept consistent between the virtualized network storage system 8 and the network storages before and after the movement of files in free disk space rebalancing of the present invention. On this account, it is required to make a file directory change request from a client wait during movement of files. In case of the latter, there is no file directory structure in the network storages 5, 6, and 7, and it is required to have a backup of the file directory structure of the virtualized network storage system 8. However, since each network storage has its own file directory structure, the file directory structure need not be kept consistent between the virtualized network storage system 8 and the individual network storages before and after movement of files. It is unnecessary to make a directory change request from a client wait during movement of files. If importance is to be attached to the availability of the system, the former structure can be employed. If importance is to be attached to the capability to process accesses during free disk space rebalancing, the latter structure can be employed.

The free disk space rebalancing means 10 of the present invention comprises a free disk space measuring unit 150, a rebalancing controller 160, a file object mover 170, configuration information 180 for rebalancing controller, control information 190 for file rebalancing, control information 200 for file object mover, and an access monitoring unit 210. The free disk space measuring unit 150 constantly monitors the free disk spaces in the individual network storages, and instructs the rebalancing controller 160 to start free disk space rebalancing if required. The details will be described in the section of (Free Disk Space Measuring Unit) below. The rebalancing controller 160 determines network storages from and to which files are to be moved, and controls the file object mover 170. The details will be described in the section of (Rebalancing Controller) below. The file object mover 170 moves files specified by the rebalancing controller 160 from a source network storage to a destination network storage. The details will be described in the section of (File Object Mover) below. The details of the configuration information 180 for the free disk space rebalancing means will be described in the section of (Configuration Information for Free Disk Space Rebalancing Means) below. The details of the control information 190 for file rebalancing will be described in the section of (Control Information for File Rebalancing) below. The details of the control information 200 for file object mover will be described in the section of (Control Information for File Object Mover) below. The access monitoring unit 210 constantly monitors file access requests from clients and instructs the rebalancing controller 160 to start free disk space rebalancing if required. The details will be described in the section of (Access Monitoring Unit) below.

(File Location Information)

The file location information 90 is a mapping table for holding the correlation between files managed in the virtualized network storage system 8 and the network storages in which the files are to be stored. The file access processing unit 110 can use the file location information 90 to obtain the network storage identifier for a specified network storage which stores a file. If a file is moved by free disk space rebalancing and the network storage as the storage location is changed, the following takes place: the file object mover 170 changes the network storage identifier for the storage location corresponding to the file in the file location information 90 in accordance with the details of rebalancing.

The file location information 90 is generated using the file system 100. In the file system 100, the same files and directories structure as the virtualized network storage system 8 is built. For the files in the virtualized network storage system 8, corresponding dummy files are placed in corresponding places in the file system. The network storage identifier for the network storages which keeps the files are recorded in the dummy files.

When the file access processing unit 110 makes an inquiry about the storage location of a file, the file system 100 searches for the files and directories structure. Then, the file system 100 sends back the network storage identifier, described in the dummy file corresponding to the file.

(File Access Processing Unit)

The file access processing unit 110 accepts file access requests from the user at the client 1 to the virtualized network storage system 8 in a centralized manner. When receiving the above file access request, the file access processing unit 110 refers to the file location information 90 to identify the network storage which keeps the file. Then, the file access processing unit 110 transfers the access request to the remote controller 11 of the network storage which keeps the file. Further, the file access processing unit 110 counts file access requests sent from users, and records the count as access frequency Rfreq which is information to be managed in the entire virtualized network storage system 8.

(Configuration Information for Rebalancing Controller)

Figure 2:
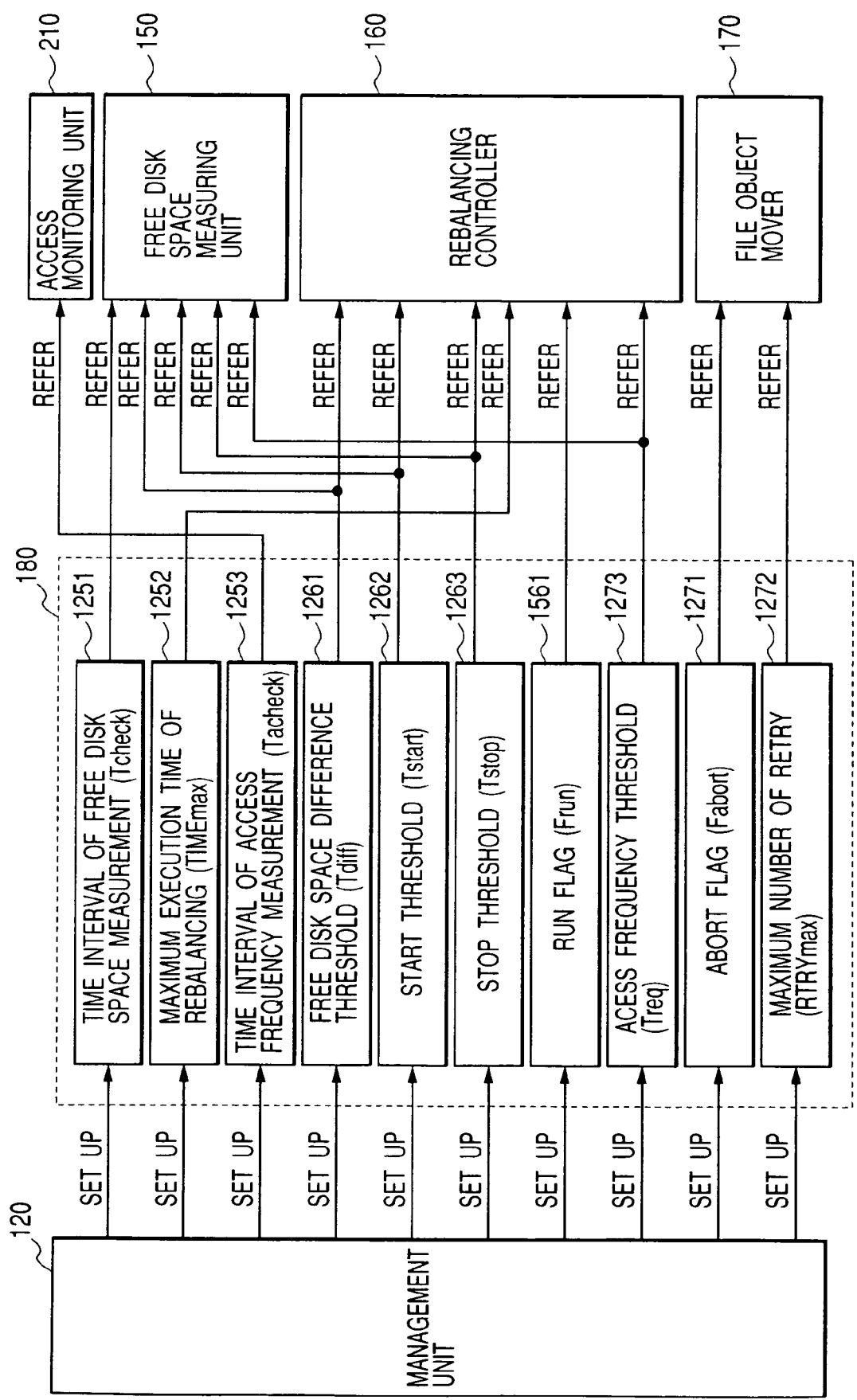
FIG. 2 is a drawing illustrating configuration information for a free disk space rebalancing portion, set up by a management unit.

FIG. 2 illustrates the configuration information 180 for rebalancing controller. The configuration information 180 for rebalancing controller is set up by the management unit 120 and held in the virtualizing device 3. The configuration information 180 for rebalancing controller consists of time interval of free disk space monitoring (Tcheck) 1251, maximum execution time of rebalancing (TIMEmax) 1252, time interval of access frequency measurement (Tacheck) 1253, free disk space difference threshold (Tdiff) 1261, start threshold (Tstart) 1262, stop threshold (Tstop) 1263, run flag (Frun) 1561, abort flag (Fabort) 1271, maximum number of retries (RTRYmax) 1272, and access frequency threshold (Treq) 1273. The time interval of free disk space measurement 1251 and the maximum execution time of rebalancing 1252 are used in scheduling for free disk space rebalancing. The time interval of access frequency measurement 1253 is a time interval at which file access requests from clients are monitored. The free disk space difference threshold 1261, start threshold 1262, stop threshold 1263, and access frequency threshold 1273 are used to determine start and end of free disk space rebalancing. The maximum number of retries 1272 is used in selection of network storages.

The time interval of free disk space measurement 1251 is a time interval at which the free disk spaces in network storages are monitored. It is set up by the administrator and referred to by the free disk space measuring unit 150. The time interval of free disk space measurement 1251 is preferably one hour to several weeks, but a longer or shorter time interval is acceptable. The shorter the time interval of free disk space measurement 1251 is, the more accurately the situation can be grasped in rapid decrease in free disk space. However, since the free disk space monitoring processing itself is frequency carried out, the speed of processing by the virtualizing device is lowered. To cope with this, the time interval of free disk space measurement 1251 should be properly set up according to increase or decrease in free disk space.

The maximum execution time of rebalancing 1252 is referred to by the rebalancing controller 160. It is configuration information indicating the upper limit of duration for which rebalancing should be continued. When the maximum execution time of rebalancing 1252 has passed after start of free disk space rebalancing, the rebalancing controller 160 forcedly terminates the processing regardless of a rebalancing completion condition. Owing to this function, it is possible to meet a demand, for example, to perform free disk space rebalancing only in periods of time when access requests from the client 1 are few. A period of time of several minutes to one day is suitable for the maximum execution time of rebalancing 1252.

The time interval of access frequency measurement 1253 is a time interval at which it should be examined how frequently file access requests from clients are transferred to the virtualized network storage system. It is referred to by the access monitoring unit 210.

The free disk space difference threshold (Tdiff) 1261 is configuration information for judging whether an imbalance of free disk spaces is occurred in the system. It is a threshold of the difference between the maximum value and minimum value of free disk spaces. The free disk space difference threshold is referred to by the free disk space measuring unit 150 and the rebalancing controller 160. If the difference between the maximum value and minimum value of free disk spaces is not less than Tdiff 1261, the free disk space measuring unit 150 judges that the free disk space has greatly varied from one network storage to another. Then, the free disk space measuring unit 150 instructs to start free disk space rebalancing. If the difference between the maximum value and minimum value of free disk spaces is less than Tdiff 1261, the free disk space measuring unit 150 judges that free disk spaces among the network storages has been balanced. Then, the free disk space measuring unit 150 instructs to terminate free disk space rebalancing. As Tdiff 1261, a value not less than 0B and less than the disk space of a network storage having the smallest disk space is taken. If the disk space of a network storage, smallest in disk space, of the multiple network storages is 100 GB, a value between 1 GB and 20 GB or so is appropriate for Tdiff 1261. Any value from 0 to 100 GB may be selected.

The start threshold (Tstart) 1262 is a threshold for starting free disk space rebalancing and referred to by the free disk space measuring unit 150 and the rebalancing controller 160. When the minimum value of free disk spaces of the network storages becomes less than Tstart 1262 and there is an imbalance of free disk spaces, free disk space rebalancing is started.

The stop threshold (Tstop) 1293 is a threshold for stopping free disk space rebalancing if there is substantially no space in every network storage and a file cannot be moved. It is referred to by the free disk space measuring unit 150 and the rebalancing controller 160. When the maximum value of the free disk spaces in the individual network storages becomes smaller than Tstop 1262, free disk space rebalancing is inhibited.

The maximum number of retries (RTRYmax) 1272 is a threshold of number of times of retrying file selection made by the file object mover 170. RTRYmax is for inhibiting movement of files from a network storage which keeps a large number of large files to another network storage. The abort flag (Fabort) 1271 is a flag for aborting free disk space rebalancing. The abort flag is set up by the management unit 120 according to an instruction from the administrator and referred to by the rebalancing controller 160.

The access frequency threshold (Treq) is a threshold for starting and stopping free disk space rebalancing and referred to by the access monitoring unit 210 and the rebalancing controller 160. The access monitoring unit 210 monitors the access frequency (Rfreq). If the access frequency (Rfreq) is lower than the access frequency threshold (Treq), the access monitoring unit 210 instructs to start free disk space rebalancing. If the access frequency (Rfreq) exceeds the access frequency threshold (Treq) when free disk space rebalancing is being performed, the access monitoring unit 210 instructs to abort the free disk space rebalancing.

(Control Information for File Rebalancing)

Figure 3:
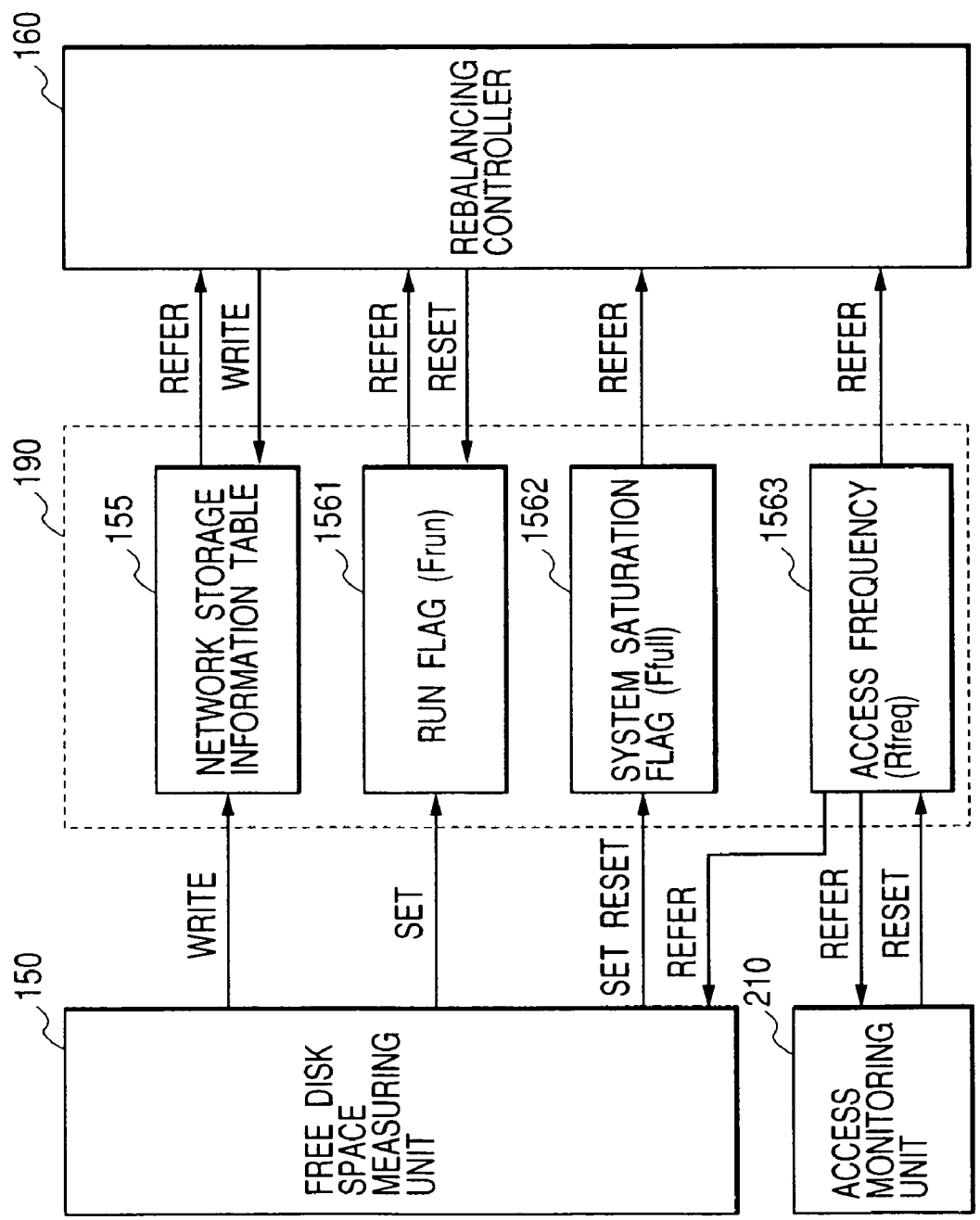
FIG. 3 is a drawing illustrating information required for linkage between a free disk space measuring unit and a rebalancing controller.

FIG. 3 illustrate the control information 190 for file rebalancing. The control information 190 for file rebalancing consists of a network storage information table 155, a run flag (Frun) 1561, a system saturation flag (Ffull) 1562, and access frequency (Rfreq) 1563. The control information 190 for file rebalancing is information used in linkage between the free disk space measuring unit 150 or access monitoring unit 210 and the rebalancing controller 160. It is held in the virtualizing device 3.

The network storage information table 155 is a table for storing information on the disk spaces in the individual network storages. The details will be described in the section of (Network Storage Information Table) below.

The run flag 1561 is set up by the free disk space measuring unit 150 and instructs the rebalancing controller 160 to start free disk space rebalancing. The system saturation flag 1562 is set up by the free disk space measuring unit 150 and indicates that the available disk space has substantially run out in every network storage. With the system saturation flag 1562 set up as "1," free disk space rebalancing is not performed even if the run flag 1561 is set up as "1."

The access frequency 1563 is set up by the file access processing unit 110 and is referred to by the rebalancing controller 160 and the access monitoring unit 210. The access monitoring unit 210 resets the access frequency 1563 at the time interval of access frequency measurement 1253.

(Network Storage Information Table)

FIG. 4 illustrates the network storage information table 155.

Column 1551 indicates the network storage identifier for the individual network storages and functions as an index when data is written to and read from the network information table 155. Column 1552 indicates the disk spaces in the individual network storages (capacities available with no files stored). Column 1553 indicates the current free disk spaces in the individual network storages. This column is periodically set up by the free disk space measuring unit 150. This column is used by the rebalancing controller 160 to judge from which network storage to which network storage files should be moved and how much data should be moved. The column is also used to judge the end of the processing. In case of the example in FIG. 4, where gigabytes is taken as the unit of disk space, the disk spaces of the network storages 1, 2, 3, and 4 are 120 GB, 100 GB, 200 GB, and 180 GB, respectively. Their free disk spaces are 30 GB, 20 GB, 80 GB, and 90 GB, respectively.

(Control Information for File Object Mover)

Figure 5:
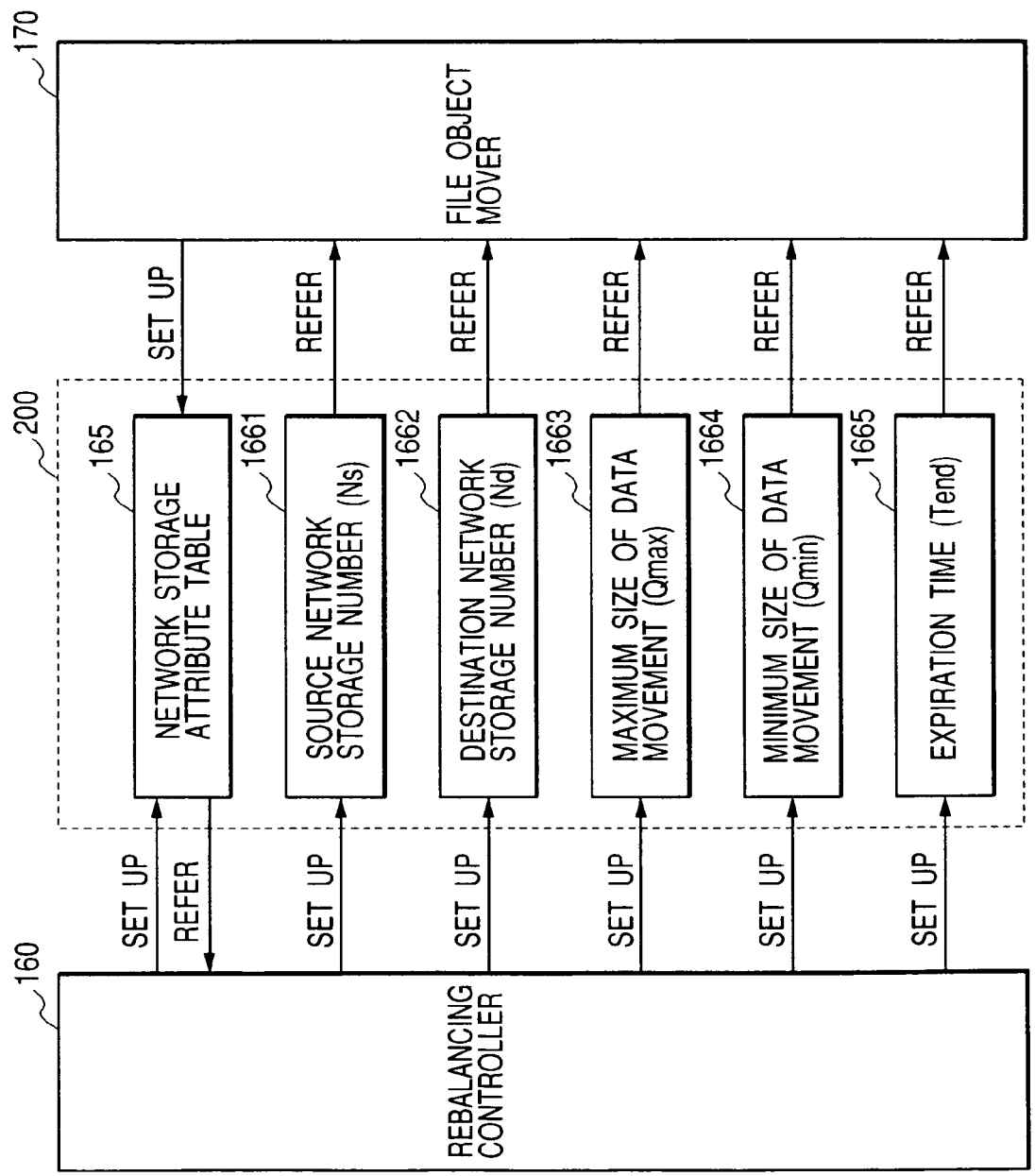
FIG. 5 is a drawing illustrating information required for linkage between the rebalancing controller and a file object mover.

FIG. 5 illustrates control information 200 for file object mover. The control information 200 for file object mover consists of a network storage attribute table 165, a source network storage number (Ns) 1661, a destination network storage number (Nd) 1662, maximum size of data movement (Qmax) 1663, minimum size of data movement (Qmin) 1664, and expiration time (Tend) 1665. The control information 200 for file object mover is information used in linkage between the rebalancing controller 160 and the file object mover 170, and kept in the virtualizing device 3.

The network storage attribute table 165 is a table for recording attribute information indicating whether the individual network storages are selectable as the storage to or from which files are to be moved. It is used to determined from which network storage to which network storage files are to be moved and prevent large files from being moved. The details will be described in the section of (Network Storage Attribute Table) below. The source network storage number (Ns) 1661 is the identifier of the network storage from which files are to be moved. The destination network storage number (Nd) 1662 is the identifier of the network storage to which files are to be moved. The maximum size of data movement (Qmax) 1663 is a maximum amount of data moved by the file object mover 170 at a time. The minimum size of data movement (Qmin) 1664 is a minimum amount of data moved by the file object mover 170 at a time. The expiration time (Tend) 1665 is time when rebalancing is forcedly terminated and equal to a value obtained by adding the maximum execution time of rebalancing 1252 to rebalancing start time. When the expiration time 1665 has passed, the file object mover 170 terminates processing even if files are being moved.

(Network Storage Attribute Table)

FIG. 6 illustrates the network storage attribute table 165. Column 1651 indicates network storage identifiers. Column 1652 indicates whether the individual network storages are selectable as the source network storage. If "NULL" is set in Column 1652, the network storage concerned can be selected as the source network storage. If "Don't Select" is set, the network storage concerned is not selected as the source network storage. In case of the example in FIG. 6, the network storage 3 or the network storage 4 is not selected as the source network storage. Column 1652 indicates whether the individual network storages are selectable as the destination network storage. If "NULL" is set in Column 1653, the network storage concerned can be selected as the source network storage. If "Don't Select" is set, the network storage concerned is not selected as the destination network storage. In case of the example in FIG. 6, the network storage 2 or the network storage 4 is not selected as the destination network storage. The network storage 4 is not selected as the source network storage and not as the destination network storage, either.

(Free Disk Space Measuring Unit)

Figure 7:
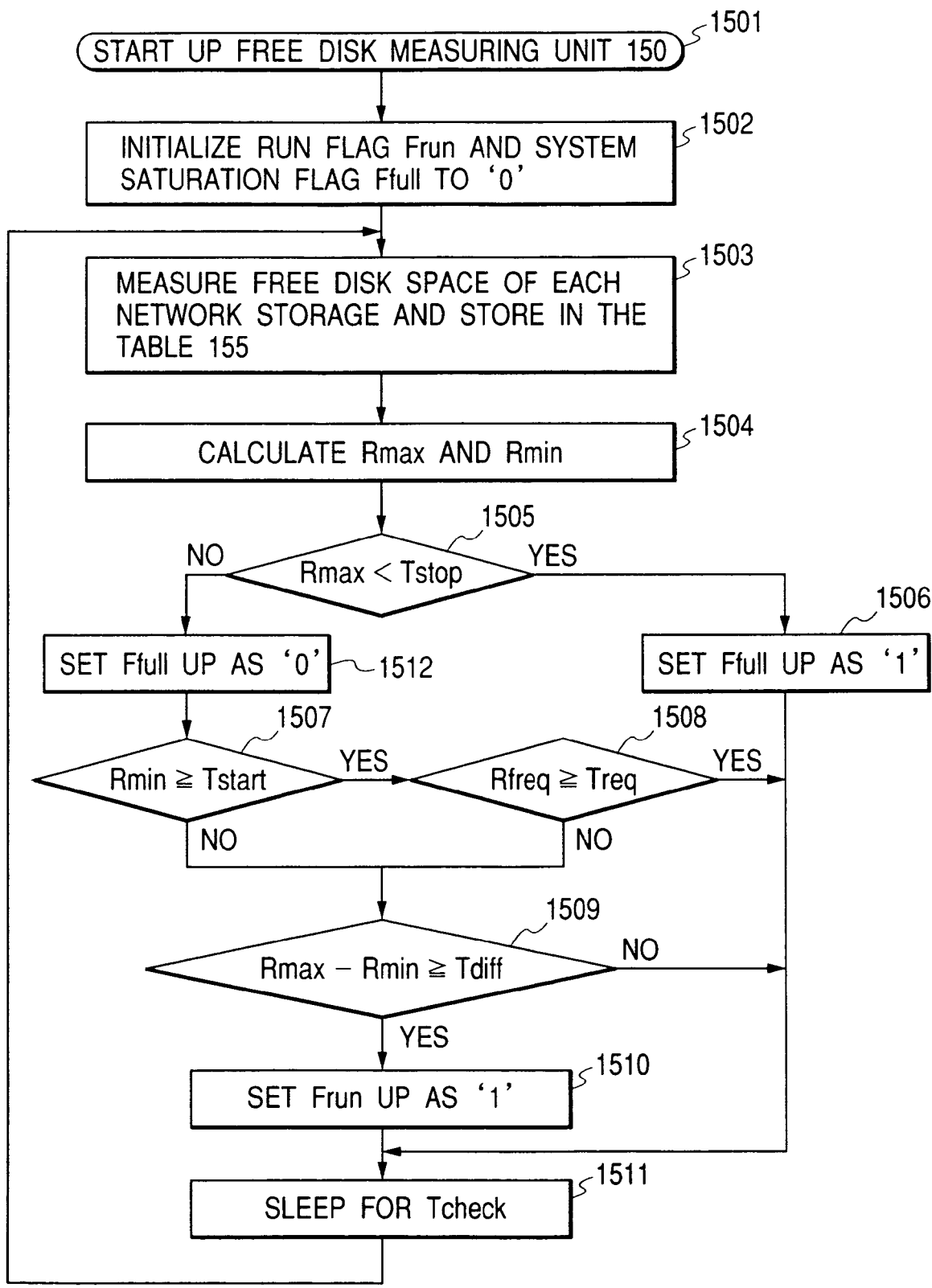
FIG. 7 is a drawing illustrating the flow of processing performed by the free disk space measuring unit.

The free disk space measuring unit 150 periodically measures the free disk spaces in the individual network storages and instructs the rebalancing controller 160 to start or terminate rebalancing. FIG. 7 illustrates the flow of processing performed by the free disk space measuring unit.

When the free disk space measuring unit 150 is started up at Step 1501, the free disk space measuring unit 150 initializes the run flag (Frun) 1561 and the system saturation flag (Ffull) 1562 to "0." (Step 1502). Then, the free disk spaces in the individual network storages are measured, and the result of measurement is written in Column 1553 for free disk space of the network storage information table 155, illustrated in FIG. 4 (Step 1503). The free disk space measurement may be made by issuing the STATFS procedure of the NFS protocol to the individual network storages. Any other method may be used as long as the information on the free disk spaces in the individual network storages can be acquired through the network. Subsequently, the maximum value (Rmax) and minimum value (Rmin) of the free disk spaces in the individual network storages are determined from the result of the measurement (Step 1504). At Step 1505, the maximum value (Rmax) of free disk space and the stop threshold (Tstop) 1263 are compared with each other. If the maximum value (Rmax) of free disk space is less than Tstop 1263, the system saturation flag (Ffull) 1562 is set up as "1" at Step 1506. Then, Steps 1507 to 1510 are skipped and the operation proceeds to Step 1511. If Rmax is equal to or greater than Tstop 1263, the system saturation flag (Ffull) 1562 is set up as "0" at Step 1512, and the operation proceeds to Step 1507, and the minimum value (Rmin) of free disk space is compared with the start threshold (Tstart) 1262. If Rmin is equal to or greater than Tstart, the operation proceeds to Step 1508 and the access frequency Rfreq and the access frequency threshold Treq are compared with each other. In either case where Rmin is less than Tstart 1262 at Step 1507 or Rfreq is less than Treq at Step 1508, the operation proceeds to Step 1509. At Step 1509, the difference between the maximum value (Rmax) and Rmin of free disk spaces and the free disk space difference threshold (Tdiff) 1261 are compared with each other. If the difference is equal to or greater than Tdiff 1261, at Step 1510, the run flag (Frun) 1562 is set up as "1" to instruct the rebalancing controller 160 to start rebalancing. In either case where Rfreq is equal to or greater than Treq at Step 1508 or where the difference is less than Tdiff 1261 at Step 1509, Step 1510 is skipped, and the operation proceeds to Step 1511. At Step 1511, "sleep" lasts until the time obtained by adding the time interval of free disk space measurement (Tcheck) 1251 to the time when Step 1503 is carried out. Then, the operation goes back to Step 1503.

The free disk space measuring unit 150 measures the free disk spaces in the individual network storages at the time interval of free disk space measurement (Tcheck) 1251 preset by the administrator. Based on the result of the measurement, the rebalancing controller 160 judges whether to perform rebalancing. For this reason, rebalancing is performed at the time interval of free disk space measurement 1251. The time interval of free disk space measurement 1251 acts as the counter for maintaining the interval of rebalancing execution.

(Access Monitoring Unit)

The access monitoring unit 210 examines the frequency of file access requests from clients. This examination is carried out at the time interval of access frequency measurement (Tacheck) 1253 determined by the administrator or the vendor of the virtualized network storage system. The access frequency Rfreq is incremented each time the file access processing unit 110 accepts a file access request. The access monitoring unit 210 resets the access frequency Rfreq at the time interval of access frequency measurement 1253.

(Rebalancing Controller)

The rebalancing controller 160 constantly monitors the run flag (Frun) 1561 and system saturation flag (Ffull) 1562 set by the free disk space measuring unit 150. When these flags are set, the rebalancing controller 160 starts free disk space rebalancing.

Figure 8:
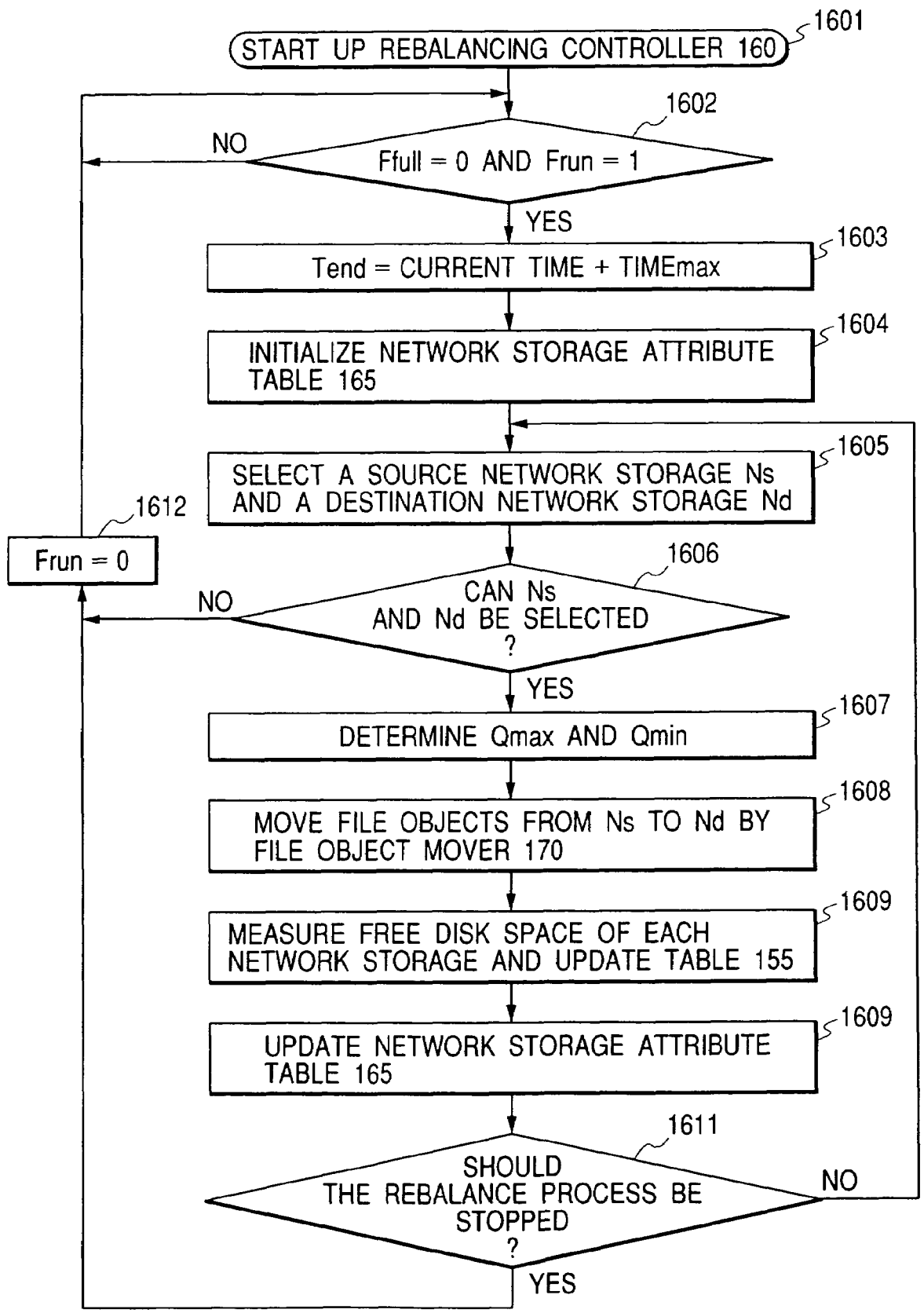
FIG. 8 is a drawing illustrating the flow of processing performed by the rebalancing controller.

FIG. 8 illustrates the flow of processing performed by the rebalancing controller 160. Roughly speaking, the process flows as follows: determination of start of rebalancing, to selection of network storages from and to which files are to be moved, to file moving step 163, to judgment of end of rebalancing.

When started up at Step 1601, the rebalancing controller 160 starts to monitor Frun 1561 and Ffull 1562 (Step 1602). When free disk spaces are balanced, the loop of Step 1602 is repeated and free disk space rebalancing is not started because Frun 1561 is set to "0". Where the system saturation flag (Ffull) is set up as "1" as well, the loop of Step 1602 is repeated. If the value of the system saturation flag (Ffull) is "0" and further the run flag (Frun) is set up as "1," rebalancing is started. First, at Step 1603, the rebalancing start time (current time) is measured, and the expiration time (Tend) 1665 of rebalancing is set. The expiration time (Tend) is calculated by adding the maximum execution time of rebalancing (TIMEmax) 1252 to the start time. At Step 1604, the network storage attribute table 165 is initialized. The flow of processing at Step 1604 will be described in details in the section of (Initialization of Network Storage Attribute Table) below.

At Step 1605, a source network storage (Ns) 1661 and a destination network storage (Nd) 1662 are selected. The flow of processing at Step 1605 will be described in details in the section of (Selection of Network Storages) below.

Next, it is judged whether the source network storage (Ns) 1661 and the destination network storage (Nd) 1662 are properly selected (Step 1606). If Ns 1661 or Nd 1662 is not selected, Steps 1607 to 1611 are skipped and the operation proceeds to Step 1612. Then, the run flag (Frun) is reset, and the free disk space rebalancing is terminated. If Ns 1661 and Nd 1662 are selected, the maximum size of data movement (Qmax) 1663 and the minimum size of data movement (Qmin) 1664 are determined (Step 1607). Letting the free disk space in the source network storage (Ns) 1661 and that in the destination network storage (Nd) 1662 be Rs and Rd, respectively, Qmax 1663 is expressed as (Rd−Rs)/2 and Qmin 1664 is expressed as Qmax 1663−Tdiff 1261/2.

Next, the file object mover 170 is started up to move files from the source network storage (Ns) 1661 to the destination network storage (Nd) 1662. The movement is continued until the amount of moved data exceeds Qmin 1664 (Step 1608). At this time, the file object mover 170 moves files so that the amount of moved data will not exceeds Qmax.

Next, the free disk spaces in the individual network storages are measured, Column 1553 of the network storage information table 155, illustrated in FIG. 4, is overwritten with the result of the measurement (Step 1609).

Subsequently, referring to the updated Column 1553 for free disk space, the network storage attribute table 165 is updated (Step 1610). The flow of processing at Step 1610 will be described in details in the section of (Updating of Network Storage Attribute Table) below.

At Step 1611, it is judged whether the rebalance process should be terminated. If the process should not be terminated, the operation goes back to Step 1605 to repeat the selection of a source network storage and a destination network storage. If Step 1605 is repeated after a certain time period has passed, the file movement in rebalancing becomes intermittent. Thus, interference with file accesses from clients can be reduced.

If it is judged that the rebalance process should be terminated, at Step 1612, the run flag Frun is reset to terminate the processing. The judgment at Step 1611 is made based on the judgment of whether some process interruption conditions are taken in addition to the judgment of whether the rebalancing completion condition is met. If any of these conditions is taken, the rebalancing is terminated. The rebalancing completion condition is that the difference between the maximum value (Rmax) and minimum value (Rmin) of free disk spaces is less than the free disk space difference threshold Tdiff. One of the process interruption conditions is that the current time is past the expiration time (Tend). Another process interruption condition is that the abort flag Fabort, described with respect to FIG. 2, is set up. Therefore, if the maximum execution time of rebalancing TIMEmax has been spent on the rebalancing process or if the administrator specifies abort, the rebalancing is terminated. A further process interruption condition is that the maximum value (RMAX) is less than the stop threshold (Tstop) 1293. It is terminated even if there is a difference remaining between the free disk spaces in the individual network storages. A still further process interruption condition is that the minimum value (Rmin) of free disk spaces is less than Tstart and further the access frequency Rfreq exceeds the access frequency threshold Treq. That is, a rebalance process is triggered by that the access frequency Rfreq is less than Treq, not that the free disk space in a network storage falls below Tstart. Therefore, this rebalancing is interrupted when the access frequency is increased during the processing. Thus, processing of file access requests from clients is prevented from being hindered.

(Initialization of Network Storage Attribute Table)

Figure 9:
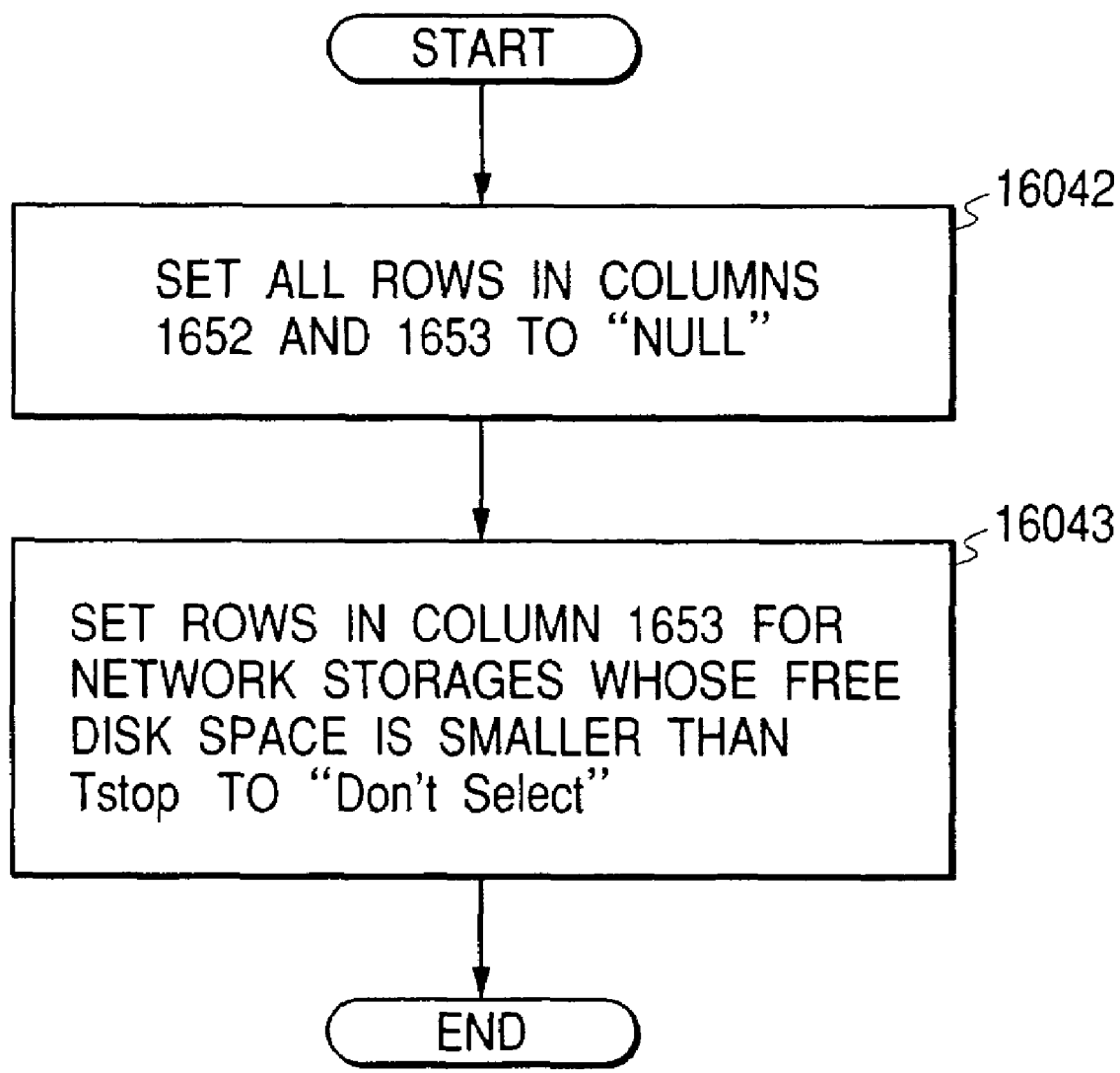
FIG. 9 is a drawing illustrating in details the flow of initialization of the network storage attribute table performed by the rebalancing controller.

FIG. 9 illustrates in details the flow of initialization of the network storage attribute table 165, illustrated in FIG. 6, performed by the rebalancing controller 160 at Step 1604 in FIG. 8.

After start of initialization, "NULL" is written into all the field in Columns 1652 and 1653 of the network storage attribute table 165 (At Step 16042). Then, referring to Column 1553 of the network storage information table 155, "Don't Select" is written into the fields in Column 1653 corresponding to network storages whose free disk space is less than the stop threshold (Tstop) 1263 (Step 16043). Thus, network storages whose free disk space is less than the stop threshold 1263 will not be selected as the destination network storage.

(Selection of Network Storages)

Figure 10:
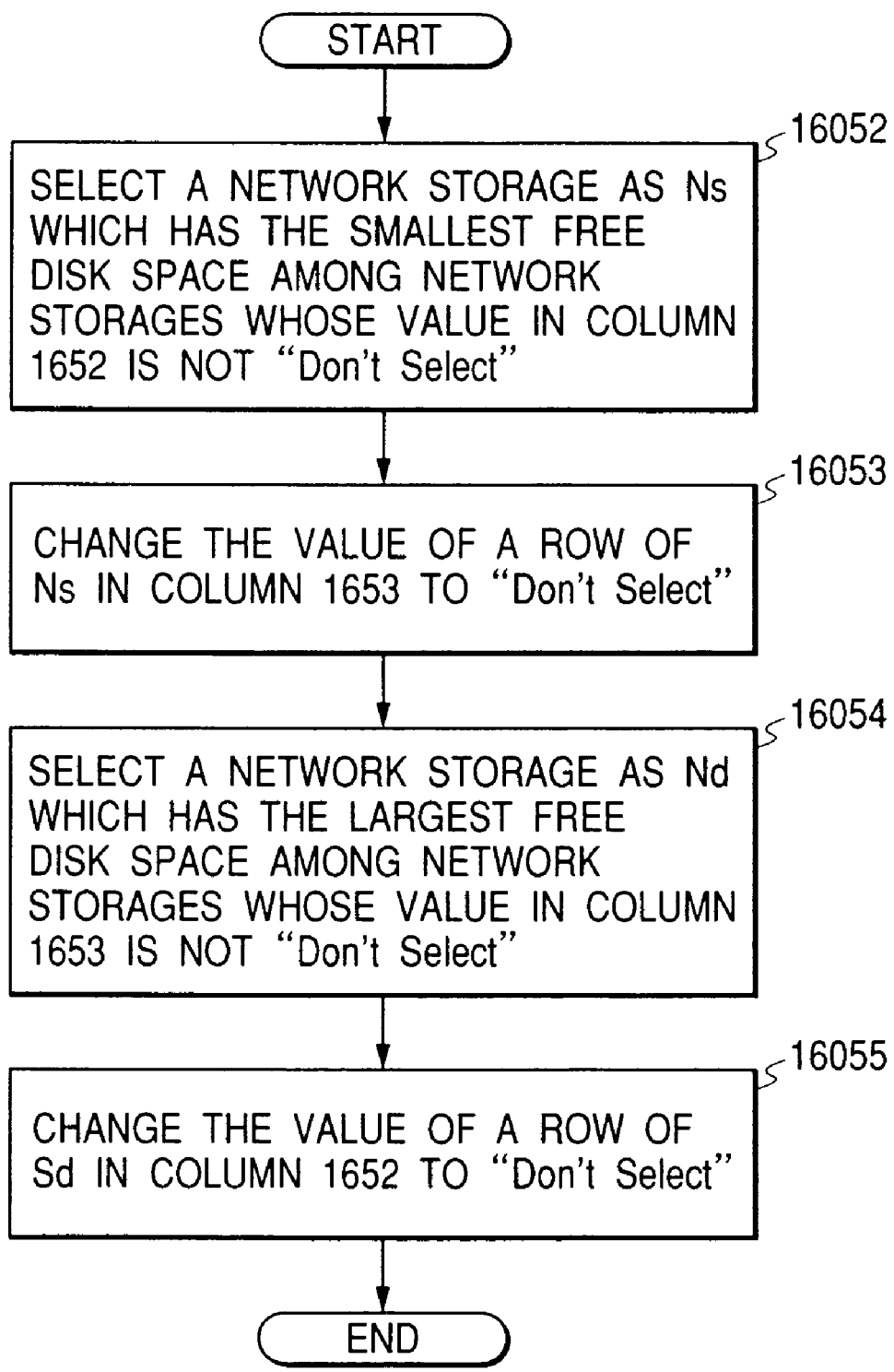
FIG. 10 is a drawing illustrating in details the flow of selection of network storages made by the rebalancing controller.

FIG. 10 illustrates in details the flow of selection of network storages, made by the rebalancing controller 160 at Step 1605 in FIG. 8.

After start of selection, a source network storage is selected from among the network storages in the network storage attribute table illustrated in FIG. 6 (Step 16052). The selection is made by taking as the source network storage number (Ns) 1661 the identifier for the network storage having the smallest free disk space of the network storages with "Don't Select" unwritten in the corresponding field in Column 1652 of the table. Then, the value of the field in Column 1653 of the network storage attribute table corresponding to Ns 1661 is changed to "Don't Select" (Step 16053). Then, a destination network storage is selected from among the network storages in the network storage attribute table 165 (Step 16054). The selection is made by taking as the destination network storage number (Nd) 1662 the identifier for the network storage having the largest free disk space of the network storages with "Don't Select" unwritten in the corresponding field in Column 1653 of the table. Then, the value of the field in Column 1652 of the network storage attribute table 165 corresponding to Nd 1662 is changed to "Don't Select" (Step 16055), and the processing is terminated.

(Updating of Network Storage Attribute Table)

Figure 11:
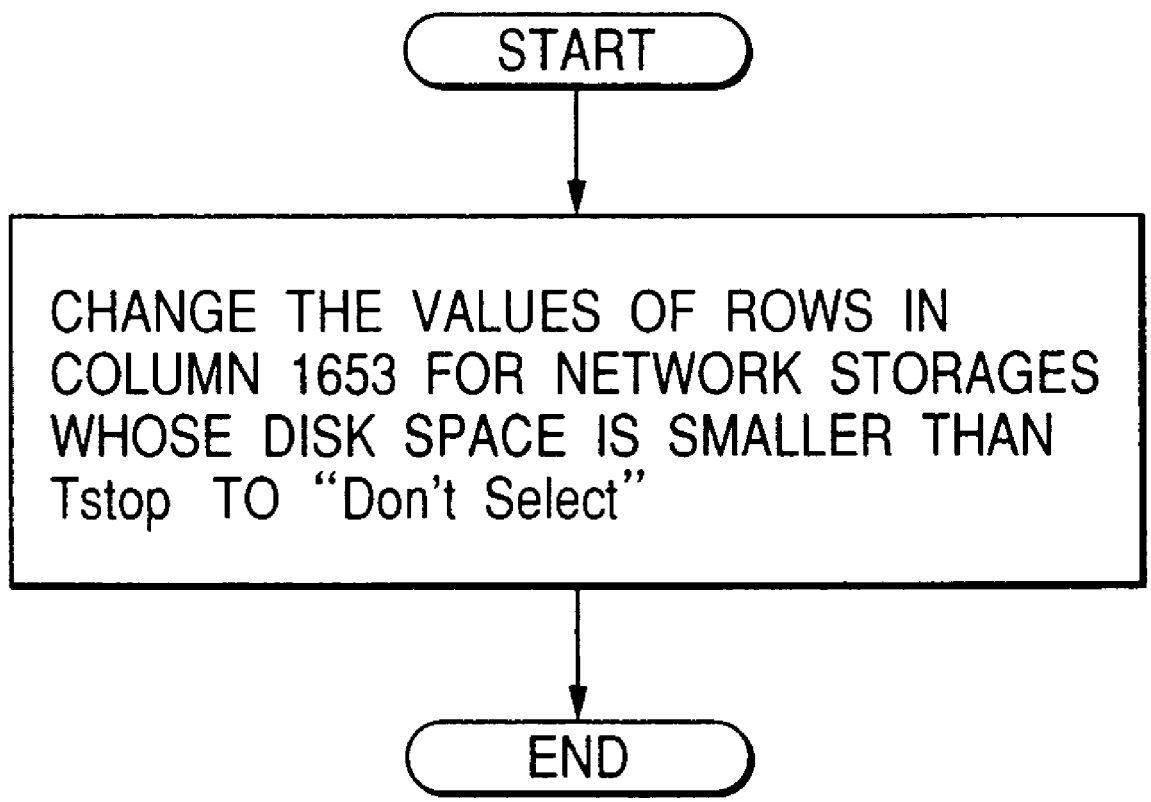
FIG. 11 is a drawing illustrating in details the flow of updating of the network storage attribute table performed by the rebalancing controller.

FIG. 11 illustrates in details the flow of updating of the network storage attribute table 165, performed by the rebalancing controller 160. After start of updating, Column 1553 for free disk space of the network storage information table 155, illustrated in FIG. 4, is referred to. Meanwhile, "Don't Select" is written into the fields in Column 1653 corresponding to network storages whose free disk space is less than the stop threshold (Tstop) 1263. Thus, network storages whose free disk space is reduced during rebalancing will not be selected as the destination network storage.

(File Object Mover)

The file object mover 170 is started up by the rebalancing controller 160, and moves files from a source network storage (Ns) 1661 to a destination network storage (Nd) 1662. This movement is continued until the total amount of moved data becomes equal to or greater than Qmin 1664. The file object mover 170 has two significant features: the first feature is that it selects files so that the free disk space in the source network storage and the free disk space in the destination network storage will not be transposed. (The file object mover 170 selects files so that the total amount of moved data will be less than the maximum size of data movement 1663.) This feature suppresses vibration in free disk spaces and prevents useless movement of files. The second feature is that if a client writes data to a file with respect to a file being moved, the write request is preferentially processed. The movement of the file is canceled and file migration is carried out again.

Figure 12:
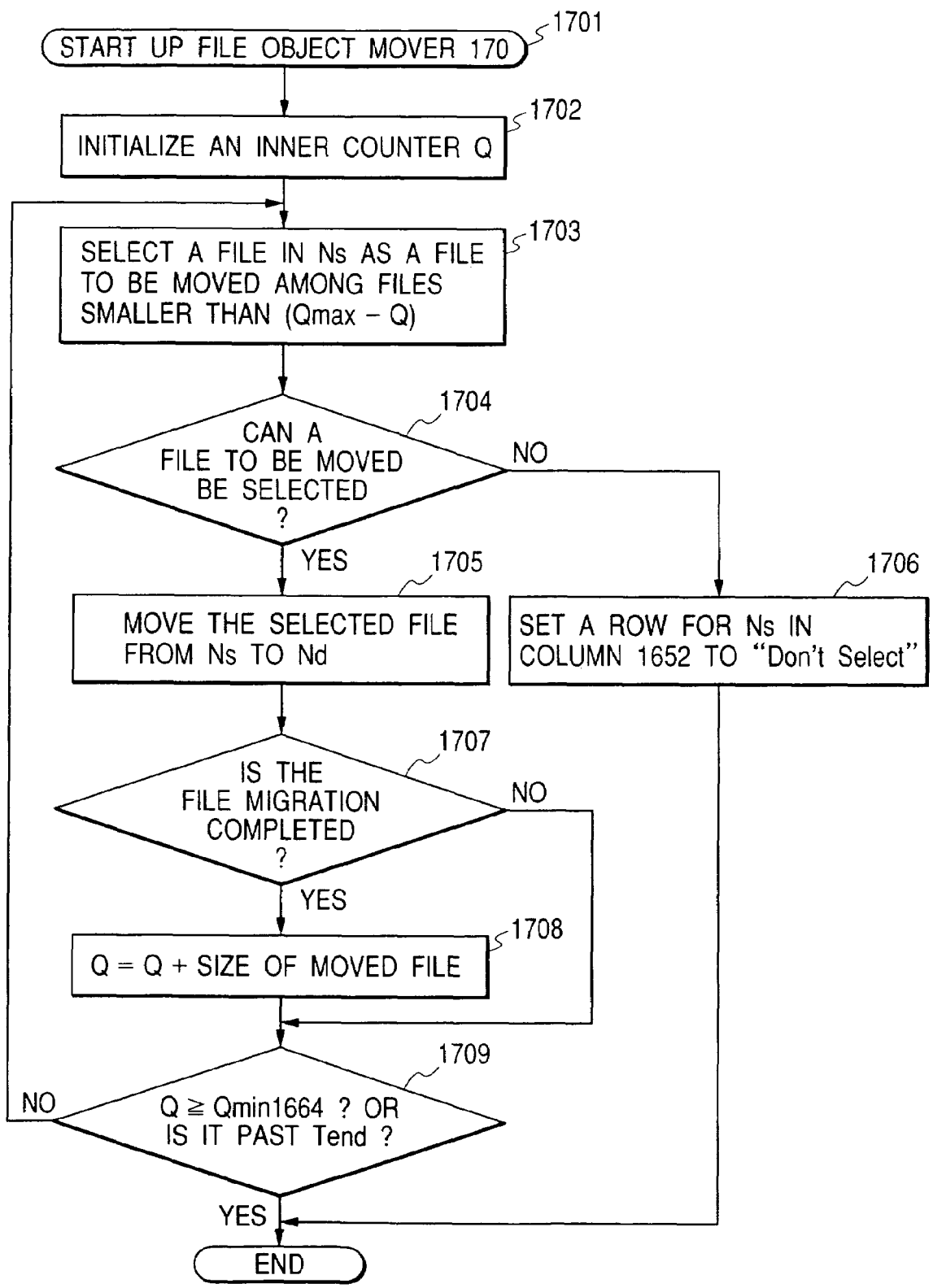
FIG. 12 is a drawing illustrating the flow of processing performed by the file object mover in the first embodiment of the present invention.

FIG. 12 illustrates the flow of processing performed by the file object mover 170.

When started up at Step 1701, the file object mover 170 initializes an inner counter Q for amount of moved data computation (Step 1702). Then, the file object mover 170 searches the file system 100 to select files to be moved (Step 1703). The file object mover 170 selects a file which is stored in Ns and whose size is less than the difference between the maximum size of data movement 1663 and the inner counter Q. The details of Step 1703 will be described in the section of (Selection of File to Be Moved) below. Next, it is judged whether a file to be moved has been properly selected (Step 1704).

If a file to be moved cannot be selected, the operation proceeds to Step 1706, and "Don't Select" is written into the field in Column 1652 of the network storage attribute table 165, illustrated in FIG. 6, corresponding to Ns 1661. Then, the processing is terminated. Network storages with "Don't Select" written in Column 1652 will not be selected as the source network storage in the network storage selecting step 162. If a file to be moved is properly selected, the file is moved from the source network storage 1661 to the destination network storage 1662 (Step 1705). The flow of movement of file will be described in details in the section of (Movement of File to Be Moved) below. Next, it is judged whether the file to be moved has been properly moved or a write access from a client has taken place and the movement of the file to be moved has been terminated halfway (Step 1707). If the movement of the file to be moved is terminated halfway, Step 1708 is skipped and the operation proceeds to Step 1709. If the movement of the file to be moved is properly completed, the operation proceeds to Step 1708. Then, the size of moved files is added to the value on the inner counter Q for counting the amount of moved data to update the counter. If the value on the counter Q is equal to or greater than the minimum size of data movement (Qmin) 1664 at Step 1709, the processing by the file object mover 170 is terminated. The processing by the file object mover 170 is also terminated if the expiration time (Tend) 1665 has passed at Step 1709. In the other cases, the operation goes back to Step 1703 and the movement of files is continued. Files may be continuously moved or moved at certain time intervals. In case files are moved at certain time intervals, disk accessing can be dispersed, and thus influences on file access requests from clients can be reduced.

(Selection of File to Be Moved)

Figure 13:
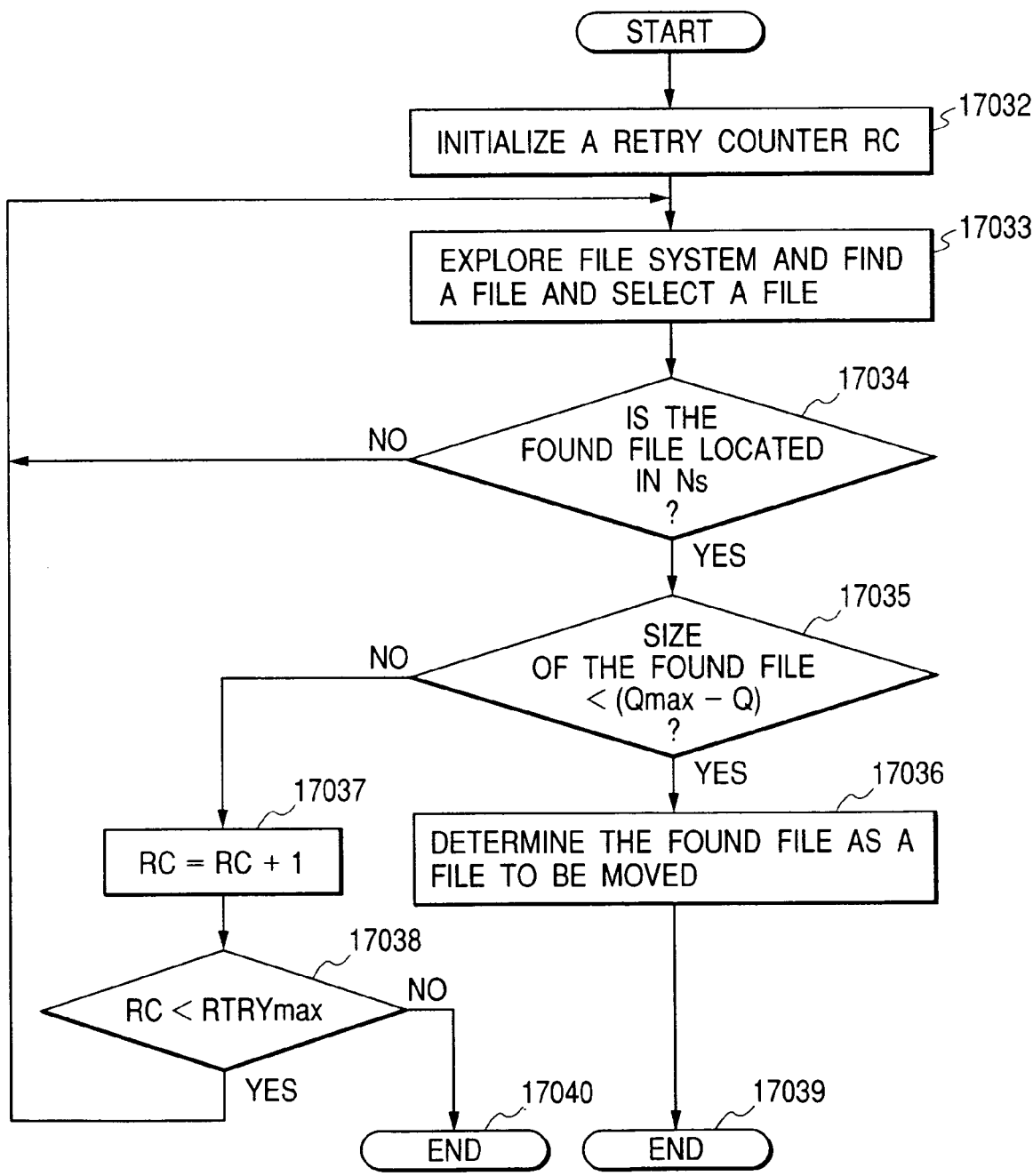
FIG. 13 is a drawing illustrating in details the flow of selection of a file to be moved, made by the file object mover in the first embodiment of the present invention.

FIG. 13 illustrates in details the flow of selection of a file to be moved, made by the file object mover 170 at Step 1703 in FIG. 12.

When selection of a file to be moved is started, a retry counter RC for measuring the number of retries to select files is initialized at Step 17032. At Step 17033, the file system is recursively searched for a file concerned. At Step 17034, it is checked whether the network storage identifier of the found file is matched with the source network storage (Ns). If matched, the operation proceeds to the next step. If not, the operation goes back to Step 17033, and the same processing is repeated until the storage location is matched with Ns.

At Step 17035, it is judged whether if the found file is moved, the free disk spaces in the source and destination network storages will not be transposed. If the size of the found file is less than the difference between the maximum size of data movement 1663 and the amount Q of moved data, the transposition of free disk spaces will not take place. In this case, the file is determined as the file to be moved at Step 17036, and the processing is terminated (Step 17039). If the size of the found file is equal to or greater than the difference between the maximum size of data movement 1663 and the amount Q of moved data, the file is not selected as the file to be moved. In this case, the operation proceeds to Step 17037, and the retry counter RC is incremented.

If RC is less than the maximum number of retries RTRY-max at Step 17038, the operation goes back to Step 17033 and a file is selected again. If RC is equal to or greater than the maximum number of retries RTRYmax at Step 17038, the processing is terminated without selecting files to be moved (Step 17040).

(Movement of File to Be Moved)

Figure 14:
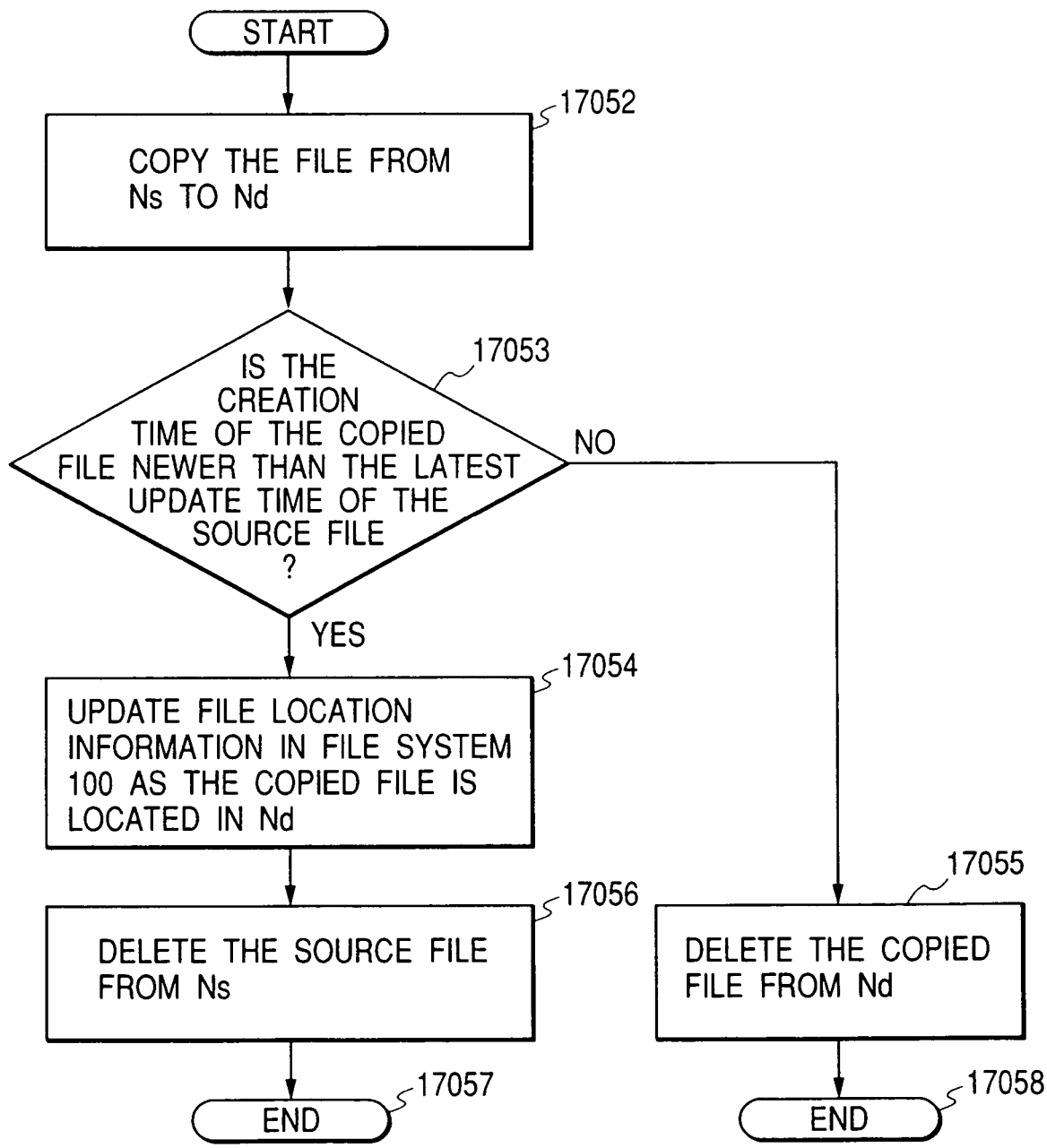
FIG. 14 is a drawing illustrating in details the flow of movement of files to be moved, caused by the file object mover in the first embodiment of the present invention.

FIG. 14 illustrates in details the flow of movement of the file to be moved, caused by the file object mover 170 at Step 1705 in FIG. 12.

When migration of a file is started, the file to be moved is copied from the source network storage Ns to the destination network storage Nd at Step 17052. At Step 17053, it is judged whether a write access from a client has taken place while the file to be moved is being copied. If the time when the copied file is generated in the destination network storage is later than the time when the file to be moved is updated last in the source network storage, no write access from a client 1 has taken place. In this case, the operation proceeds to Step 17054. Then, in the file location information 90, the network storage identifier of the file to be moved is changed from the number for the source network storage Ns to the number for the destination network storage Nd. At Step 17056, the file to be moved as the source is deleted from the source network storage Ns, and the migration of file is terminated (Step 17057). If the time when the file to be moved is updated last in the source network storage is later than the time when the copied file is generated in the destination network storage at Step 17053, it turns out that a write access from a client 1 has taken place. In this case, the file is not moved. Then, at Step 17055, the copied file is deleted from the destination network storage Nd, and the migration of file to be moved is terminated (Step 17058).

Second Embodiment

Figure 15:
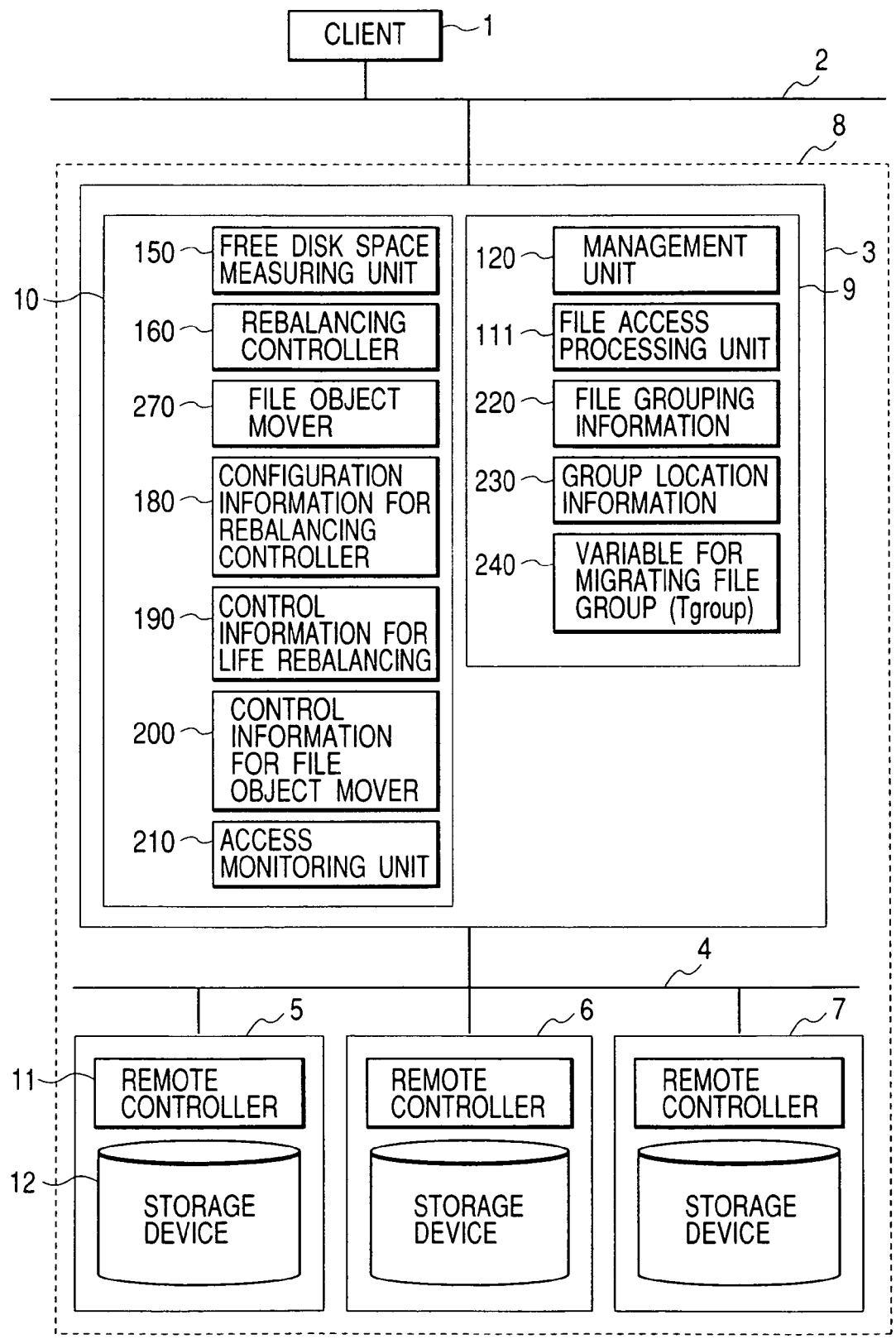
FIG. 15 is a drawing illustrating the overall constitution of the virtualized network storage system including a second embodiment of the present invention.

FIG. 15 is a drawing illustrating the overall constitution of an information system including the second embodiment of the present invention. This embodiment is a modification to the first embodiment. Therefore, differences from the first embodiment will be only described. There are two differences: a method for holding the correlation between files and network storages in which the files are stored; and processing performed when an access request from a client and a request from the file object mover are concurrent.

In the first embodiment, information on network storages as the storage locations of files in the virtualized network storage system are kept in the file location information. In the second embodiment, file grouping information 220 holds group information to which files belong in the virtualized network storage system 8. Further, group location information 230 holds information on network storages as the storage locations of the groups. Correlation between files and network storages as the storage locations of the files is not held only in the file location information. It is classified into file grouping information 220 and group location information 230 and managed. Thus, information on correlation between files and network storages as the storage locations can be reduced. With managed file grouping information 220 and group location information 230 separated from each other, file migration in free disk space rebalancing can be carried out on a group-by-group basis.

In the first embodiment, if a file as the object of an access request from a client and a file to be moved by the file object mover in free disk space rebalancing is matched with each other, the following takes place: the rebalancing controller restarts the file object mover to perform file moving operation. In the second embodiment, if a group to which a file as the object of an access request from a client belongs (group to be accessed) and a target file group for migration of a group migrating means in free disk space rebalancing are matched with each other, the following takes place: the file access processing unit 210 abandons the access request from the client. However, in the second embodiment, if a group to be accessed and a target file group for migration are matched with each other, the same operation as in the first embodiment may be performed. That is, the rebalancing controller 160 may start up the file object mover 270 again to retry the migration of a target file group for migration.

(Virtualizing Device)

The virtualizing device 3 comprises the virtualizing means 9 based on publicly known arts and the free disk space rebalancing means 10 of the present invention. In this embodiment, the virtualizing device 3 does not hold the data portion of files and is a dedicated device tailored to management of the virtualized network storage system 8. However, the data portion of files may be held in the virtualizing device 3.

The virtualizing means 9 comprises a management unit 120, a file access processing unit 111, file grouping information 220, group location information 230, and a variable for migrating file group 240.

The file grouping information 220 holds information on groups to which files belong in the virtualized network storage system 8. The details will be described in the section of (File Grouping Information) below. The group location information 230 holds information on network storages as the storage location of the groups. The details will be described in the section of (Group Location Information) below. The file access processing unit 111 accepts a file access request in the virtualized network storage system 8 from a client 1 and processes the request. The details will be described in the section of (File Access Processing Unit) below. The details of the variable for migrating file group will be described in the section of (Variable for Migrating File Group) below.

(File Grouping Information)

The file grouping information 220 is a mapping table for holding the correlation between files in the virtualized network storage system 8 and groups to which the files belong. The file access processing unit 111 specifies a file and inquires the file grouping information 220 of the group to which the file belongs. In response thereto, the file grouping information 220 returns the group number to which the file belongs. When the network storage which stores a file is changed by free disk space rebalancing, the file location information 220 is not modified. The file grouping information 220 identifies the group to which the file belongs, from the identifier of the file and a hash function.

(Group Location Information)

The group location information 230 is a mapping table for holding the correlation between groups and network storages to which the groups belong.

The file access processing unit 111 inquires the group location information 230 of the network storage to which a group belongs by specifying a group. In response thereto, the group location information 230 returns the network storage identifier as the storage location to which the group belongs. When the network storage to which a group belongs is changed by free disk space rebalancing, a file object mover 270 changes the network storage identifier corresponding to the group in the group location information 230.

(Variable for Migrating File Group)

The variable for migrating file group (Tgroup) 240 is information used in linkage between the file access processing unit 111 and the file object mover 270. The variable for migrating file group 240 is set up by the file object mover 270, and indicates a group being migrated by the rebalancing controller. If a group is set for the variable for migrating file group 240 (a group is being migrated), the file access processing unit 111 abandons an access request from an client 1 to write into a file belonging to that group.

(File Access Processing Unit)

Figure 16:
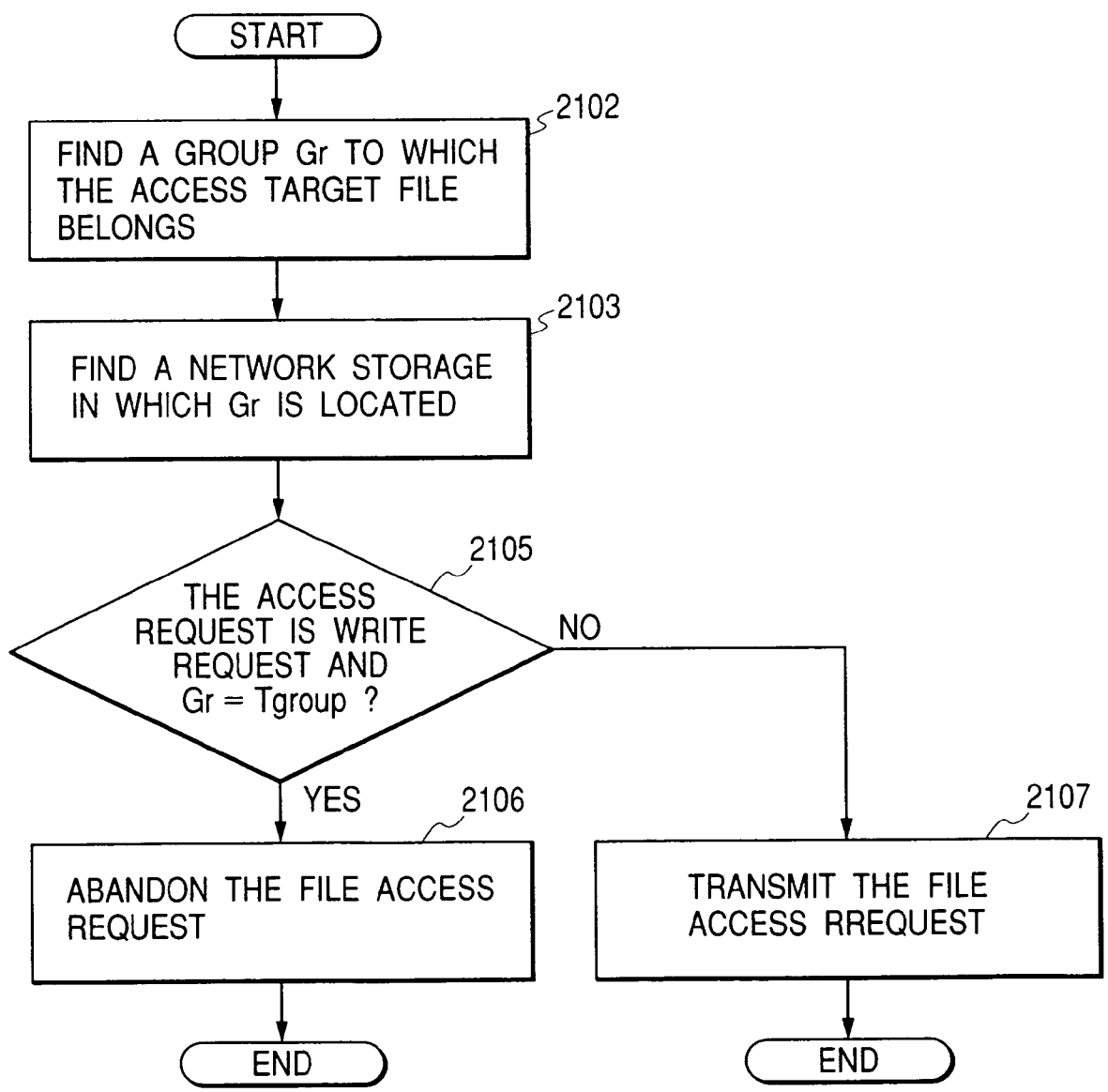
FIG. 16 is a drawing illustrating the flow of processing performed by a file access processing unit in the second embodiment of the present invention.

FIG. 16 illustrates the flow of processing performed by the file access processing unit 111. When receiving a request to access a file from a client, the file access processing unit 111 specifies the group to which the file belongs, from the file grouping information 220 (Step 2102). Then, the file access processing unit 111 identifies the network storage, in which the group is located, from the group location information 230 (Step 2103). Next, the file access processing unit 111 changes processing according to the type of the access request and the value of the variable for migrating file group 240 (Step 2105). If the access request is a write request and the group to which the file as the object of that access request belongs is set in the variable for migrating file group 240, the access request is abandoned (Step 2106). In any other case, the access request from the client 1 is transferred to the remote controller 11 of the network storage in which the group is located. Then, the access request from the client 1 is fulfilled (Step 2107).

In case of NFS, there are several types of access request to write into a file: WRITE request, CREATE request, and SETATTR request. In case of file access protocols inferior in reliability, such as UDP which is a protocol in the transport layer of NFS and the like, clients are provided with a function of automatically resending access requests. This is provided in case that an access request from a client is lost due to trouble in the network before the request reaches the server. On this account, even if an access request from a client is abandoned by the file access processing unit 111, the client recognizes that that is a network failure and resends the abandoned access request to the server.

The file access processing unit 111 abandons an access request to write into a file belonging to the target file group for migration which is being migrated and prompts the clients 1 to automatically resend the access request. The file object mover 270 completes the migration of the file belonging to the group to be migrated while the access request is resent by the automatic resending function. As a result, free disk space rebalancing can be implemented in the virtualized network storage system 8 without the access request being perceived to have stopped by the user at the client 1.

(File Object Mover)

Figure 17:
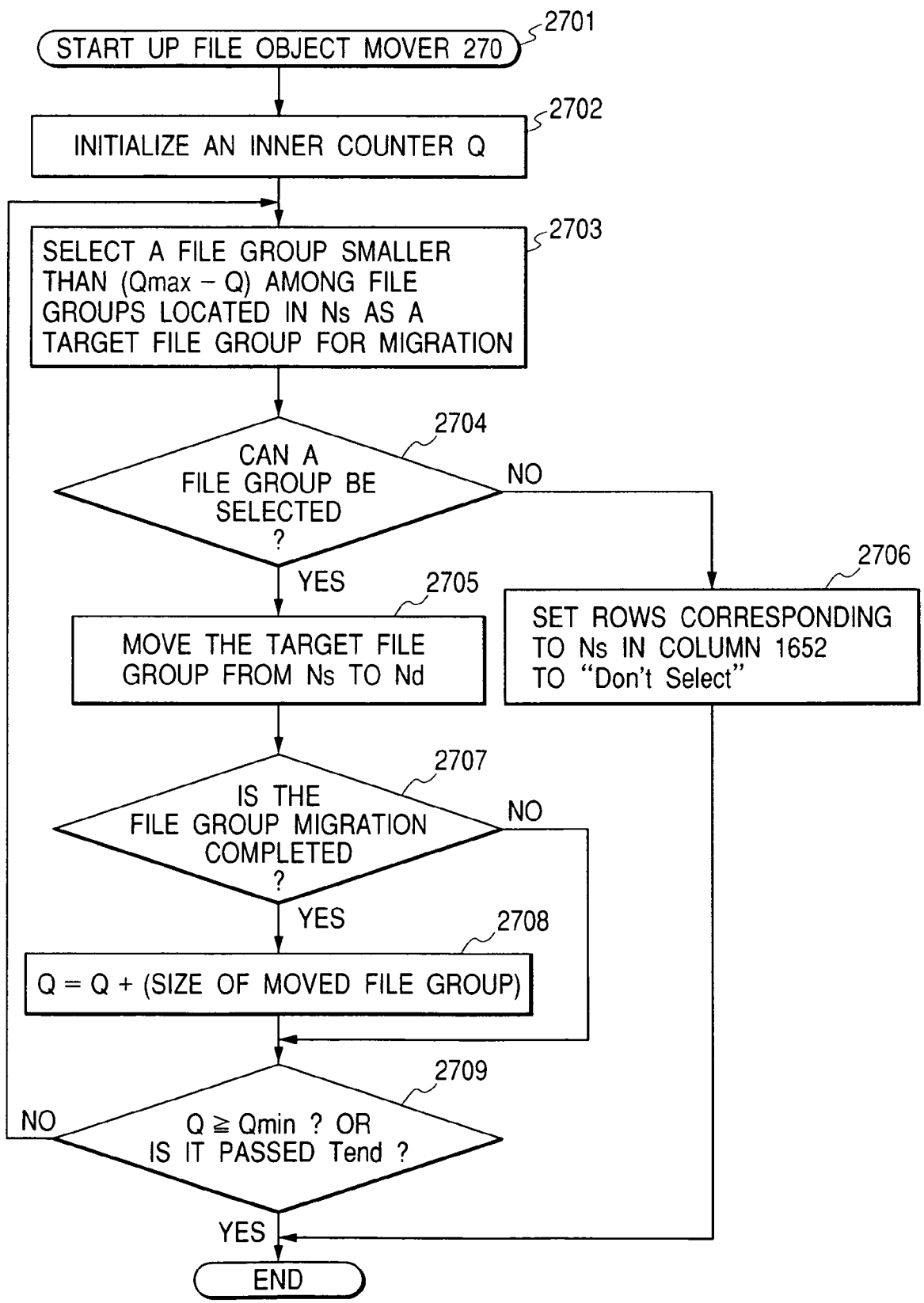
FIG. 17 is a drawing illustrating the flow of processing performed by the file object mover in the second embodiment of the present invention.

The file object mover 270 is started up by the rebalancing controller 160. The file object mover 270 migrates files from a source network storage (Ns) 1661 to a destination network storage (Nd) 1662 until the total amount of moved data becomes equal to or greater than the minimum size of data movement (Qmin) 1664. The migration of files is on a group-by-group basis. The file object mover 270 is characterized by that it selects a group to which files belong so that the free disk space in the source network storage and that in the destination network storage will not be transposed. (The file object mover 270 selects groups so that the sum of the sizes of files belonging thereto will be less than maximum size of data movement Qmax 1663.) This characteristic suppresses vibration in free disk spaces and prevents useless movement of files. FIG. 17 illustrates the flow of processing performed by the file object mover 270.

When started up at Step 2701, the file object mover 270 initializes an inner counter Q for amount of moved data calculation (Step 2702). Then, the file object mover 270 accesses the group location information 230 and selects as target file groups for migration groups which are stored in Ns and whose size is less than the difference between the maximum size of data movement 1663 and the inner counter Q (Step 2703). The details of Step 2703 will be described in the section of (Selection of Target File Group for Migration) below. Then, it is judged whether a target file group for migration has been properly selected (Step 2704). If a target file group for migration cannot be selected, the operation proceeds to 2706. Then, "Don't Select" is written into the field in Column 1652 of the network storage attribute table 165, illustrated in FIG. 4, corresponding to Ns 1661. The processing is then terminated. Network storages for which "Don't Select" has been written in Column 1652 will not be selected as the source network storage in the network storage selecting step 162. If a target file group for migration is properly selected, the operation proceeds to the next step, Step 2705. At Step 2705, the target file group for migration is migrated from the source network storage (Ns) 1661 to the destination network storage (Nd) 1662. The details of the flow of file migration will be described in the section of (Migration of Target File Group for Migration) below. Then, the size of the target file group for migration is added to the value on the inner counter Q to update the value on the counter (Step 2708). Subsequently, the count on the inner counter Q for amount of moved data and the expiration time (Tend) 1665 are examined (Step 2709). If the value on the inner counter Q for amount of moved data is equal to or greater than the minimum size of data movement (Qmin) 1664, the file migration is terminated. The file migration is also terminated if the expiration time (Tend) 1665 has passed. In the other cases, the operation goes back to Step 2703 and the file migration is continued. Files may be successively moved or moved at certain time intervals. In case files are moved at certain time intervals, disk accessing can be dispersed, and thus influences on file access requests from clients can be reduced.

(Selection of Target File Group for Migration)

Figure 18:
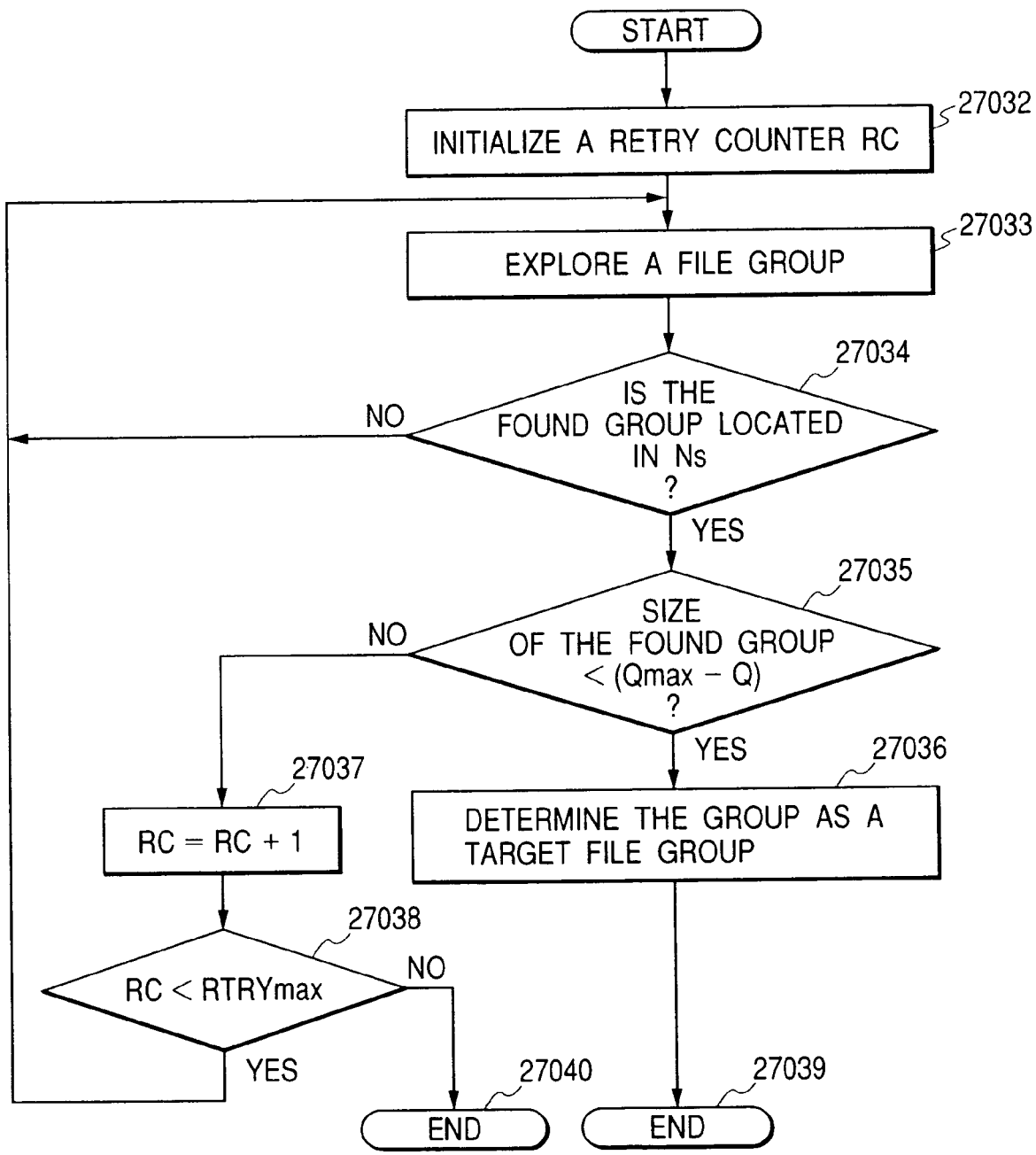
FIG. 18 is a drawing illustrating in details the flow of selection of target file groups for migration made by the file object mover in the second embodiment of the present invention.

FIG. 18 illustrates in details the flow of selection of a target file group for migration, made by the file object mover 270 at Step 2703 in FIG. 17.

After selection of a target file group for migration is started, a retry counter RC for counting the number of retries to select groups is initialized (Step 27032). Next, a group is searched for (Step 27033). It is checked whether the network storage identifier to which the found group belongs is matched with the source network storage (Ns) 1661 (Step 27034). If matched, the operation proceeds to the next step. If not, the operation goes back to Step 27033, and the same processing is repeated until the storage location is matched with Ns 1661. Next, it is judged whether if the found group is migrated, free disk spaces will not be transposed (Step 27035). If the total file size of the files belonging to the found group is less than the difference between the maximum size of data movement 1663 and the amount Q of moved data, the transposition of free disk spaces will not take place. In this case, the group is selected as the target file group for migration (Step 27036), and the processing is terminated (Step 27039). If the total size of the files belonging to the found group is equal to or greater than the difference between the maximum size of data movement 1663 and the amount Q of moved data, the group is not selected as the target file group for migration. In this case, the retry counter RC is incremented (Step 27037). If RC is less than the maximum number of retries (RTRYmax), the operation goes back to Step 17043 and a group is selected again. If RC is equal to or greater than the maximum number of retries (RTRYmax), the processing is terminated without selecting target file groups for migration (Steps 27038 and 27040).

(Migration of Target File Group for Migration)

FIG. 19 illustrates in details the flow of migration of a target file group for migration made by the file object mover 270 at Step 2705 in FIG. 17. When migration of a target file group for migration is started, information on the target file group is stored in the variable for migrating file group (Tgroup). 240 (Step 27052). Then, the files belonging to the target file group for migration are copied from the source network storage (Ns) 1661 to the destination network storage (Nd) 1662 (Step 27053). Then, the storage location of the group to be migrated in the group location information 230 is updated from the source network storage (Ns) 1661 to the destination network storage 1662 (Step 27054). Subsequently, all the files belonging to the group to be migrated are deleted from the source network storage (Ns) 1661 (Step 27055), and the variable for migrating file group 240 is cleared (Step 27056). The migration of the group is terminated.

In the method for rebalancing the free disk spaces in the virtualized network storage system of the present invention, the free disk spaces in the individual network storages are examined, and files are moved between the network storages to rebalance the free disk spaces. Thus, a steady imbalance of occupied disk spaces which occurs in a virtualized network storage system can be eliminated. Even if the disk spaces in the network storages are uneven, the free disk spaces in the individual network storages are equalized. Therefore, a system wherein if a large amount of data is written into a disk, local saturation in the network storages is less prone to occurring can be implemented. As a result, the disk spaces of the virtualized network storage system can be effectively utilized.

If a write access from a client takes place with respect to a file to be moved which is being moved by rebalancing, the rebalance process aborts the movement of the file. Or, the write access is canceled and the client is made to recognize that as network failure. As a result, rebalancing can be performed without stopping file sharing service for clients.

What is claimed is:

1. A method for rebalancing unused capacities among network storage devices in a virtualized network storage system which includes a network coupled to the network storage devices, a virtualizing device which provides, to a client computer, a single storage device configured by the network storage devices, the method comprising the steps of:

monitoring unused capacities of network storage devices of which unused capacity is smaller than a first predetermined value;

comparing between a first unused capacity of a first network storage device among monitored network storage devices and a second unused capacity of a second network storage device among monitored network storage devices, the first unused capacity is smaller than a second predetermined value, the second unused capacity is biggest among the network storage devices;

as a result of comparison, if difference between the first unused capacity and the second unused capacity is more than a third predetermined value, then, moving, via the network, one or more files from the first network storage device to the second file network storage device;

judging whether the difference between the first unused capacity and the second unused capacity is smaller than the third predetermined value;

if the difference between the first unused capacity and the second unused capacity is smaller than the third predetermined value, terminating the step of moving; and if the difference between the first unused capacity and the second unused capacity is larger than the third predetermined value, continuing the step of moving.

2. The method according to claim 1, wherein the moving step comprises the steps of:

recording the sum total of amount of moved data during executing the moving processing; and interrupting the terminating of the moving processing under execution if a sum total of the amount of moved data does exceed a predetermined threshold.

3. The method according to claim 1, wherein the moving step comprises the steps of:

recording the sum total of amount of moved data during executing the rebalancing processing; and terminating the moving processing under execution by controlling a sum total of the amount of moved data is greater than a predetermined threshold.

4. The method according to claim 1, wherein termination by the judging step is conducted within a predetermined time interval.

5. The method according to claim 1, wherein the judging step further comprises the step of:

selecting at least one of shifting to the next step following to the judging step or not terminating the moving processing under execution, when the free disk space of all of the network storage devices or the free disk space of a preset numbers of the network storage devices is a predetermined threshold space or less.

6. The method according to claim 1, wherein the moving step comprises the step of:

moving one or more files or data groups stored in a first network storage device of said multiple network storage devices to a second network storage device of said multiple network storage devices;

wherein the judging step comprises the step of:

examining free disk spaces in individual network storage devices to judge whether to continue the moving processing based on a maximum value and a minimum value of the free disk spaces and a first threshold and, if the processing should be continued, going back to said moving step and if the processing is not to be continued, terminating the processing;

wherein said virtualizing device has file location information or data group location information which is a record of a correlation between files or data groups and network storage devices which store the files or data groups; and wherein said moving of one or more files or data groups of said moving step comprises the steps of:

(1) copying files or data groups to be moved from a source network storage device to a destination network storage device, (2) deleting said files or data groups to be moved from said source network storage device, (3) updating said file or data group location information, and the virtualizing device comprises a means for, if a user sends a write access request into said file or data group while the file or data group moving step is being carried out, abandoning the access request, (4) recording a retried number for selecting a file or a data group stored in the second network storage device which is a moving destination of the first network storage device, and (5) excluding the file or the data group from an object for selection, stored in the second network storage device, of which the retried number for selecting is exceeded a predetermined threshold number, in the rebalancing processing under execution.

* * * * *